(12) United States Patent
Waldron et al.

(10) Patent No.: US 9,977,194 B2
(45) Date of Patent: May 22, 2018

(54) WIDE TEMPERATURE RANGE OPTICAL FIBER CONNECTOR WITH THERMAL EXPANSION COMPENSATION

(71) Applicant: Molex, LLC, Lisle, IL (US)

(72) Inventors: Mark Waldron, Poplar Grove, IL (US); Malcolm H. Hodge, Chicago, IL (US); Wenzong Chen, Naperville, IL (US); Dean A. Richardson, Wilmette, IL (US); Jannick Armand, Ettlingen (DE); Michael J. Gardner, Geneva, IL (US)

(73) Assignee: Molex, LLC, Lisle, IL (US)

( * ) Notice: Subject to any disclaimer, the term of this patent is extended or adjusted under 35 U.S.C. 154(b) by 49 days.

(21) Appl. No.: 14/358,070

(22) PCT Filed: Nov. 15, 2012

(86) PCT No.: PCT/US2012/065297
§ 371 (c)(1),
(2) Date: May 14, 2014

(87) PCT Pub. No.: WO2013/074803
PCT Pub. Date: May 23, 2013

(65) Prior Publication Data
US 2014/0294395 A1    Oct. 2, 2014

Related U.S. Application Data

(60) Provisional application No. 61/560,041, filed on Nov. 15, 2011.

(51) Int. Cl.
G02B 6/38      (2006.01)
H04B 10/40     (2013.01)

(52) U.S. Cl.
CPC ........... *G02B 6/3853* (2013.01); *G02B 6/381* (2013.01); *G02B 6/3823* (2013.01); *H04B 10/40* (2013.01); *G02B 6/3865* (2013.01); *G02B 6/3887* (2013.01)

(58) Field of Classification Search
None
See application file for complete search history.

(56) References Cited

U.S. PATENT DOCUMENTS 4,107,242 A * 8/1978 Runge ............... G02B 6/382
                                                    264/1.25
4,186,998 A * 2/1980 Holzman ............ G02B 6/32
                                                    257/433

(Continued)

FOREIGN PATENT DOCUMENTS

JP    2003-255184 A    9/2003
JP    2004-280088 A    10/2004

(Continued)

OTHER PUBLICATIONS

International Search Report for PCT/US2012/065297.

*Primary Examiner* — Mike Stahl
(74) *Attorney, Agent, or Firm* — Bo Huang

(57) ABSTRACT

An optical fiber assembly comprises an optical fiber having a forward end, a ferrule supporting the optical fiber, a beam expanding element aligned with the forward end of the optical fiber, and a thermal expansion compensation element adjacent the optical fiber to compensate for thermal expansion differences between the optical fiber and the ferrule.

3 Claims, 23 Drawing Sheets

(56) References Cited

U.S. PATENT DOCUMENTS

| | | | | |
|---|---|---|---|---|
| 4,190,316 A | * | 2/1980 | Malsby | G02B 6/32 24/27 |
| 4,212,514 A | * | 7/1980 | Prunier | G02B 6/264 385/29 |
| 4,291,941 A | * | 9/1981 | Melzer | G02B 6/32 29/280 |
| 4,711,518 A | | 12/1987 | Shank et al. | |
| 4,752,141 A | * | 6/1988 | Sun | G01D 5/268 250/227.21 |
| 5,097,524 A | * | 3/1992 | Wasserman | G02B 6/32 385/73 |
| 5,138,682 A | | 8/1992 | Jenkins | |
| 5,185,836 A | * | 2/1993 | Baker | G02B 6/262 385/33 |
| 5,443,057 A | | 8/1995 | Elmore | |
| 2008/0013891 A1 | * | 1/2008 | Nishioka | G02B 6/3809 385/59 |
| 2009/0304337 A1 | | 12/2009 | Sato | |
| 2011/0033159 A1 | * | 2/2011 | Kojima | G02B 6/4214 385/79 |
| 2011/0243504 A1 | * | 10/2011 | Matsui | G02B 6/32 385/74 |
| 2012/0128297 A1 | * | 5/2012 | Popp | G02B 6/3604 385/26 |
| 2014/0185990 A1 | * | 7/2014 | Hodge | G02B 6/3893 385/79 |

FOREIGN PATENT DOCUMENTS

| | | |
|---|---|---|
| JP | 2006-276736 A | 10/2006 |
| JP | 2009-037268 A | 2/2009 |

\* cited by examiner

US 9,977,194 B2

WIDE TEMPERATURE RANGE OPTICAL FIBER CONNECTOR WITH THERMAL EXPANSION COMPENSATION

REFERENCE TO RELATED APPLICATIONS

The Present Disclosure claims priority to previously-filed U.S. Provisional Patent Application No. 61/560,041, entitled "Wide Temperature Range Optical Fiber Connector With Thermal Expansion Compensation," and filed on 15 Nov. 2011. The content of the aforementioned Application is hereby incorporated by reference in its entirety herein.

BACKGROUND AND SUMMARY OF THE PRESENT DISCLOSURE

The Present Disclosure relates generally to optical fiber assemblies and, more particularly, to an optical fiber cable assembly for use within a wide temperature range and having thermal expansion compensation functionality.

It is often desirable to use optical fiber systems for signal transmission in high bandwidth applications. However, the use of optical fibers may create challenges in environments having significant ranges of operating temperatures. Automotive applications that operate within the engine compartment are subjected to relatively high and low temperatures. While some optical fiber systems may be operational within the required temperature range, such systems are often too expensive for high volume automotive applications. Lower cost systems, such as those that utilize plastic optical fiber, typically are not able to operate effectively within the required operational temperature range. In addition, plastic optical fiber systems may not have sufficient bandwidth for some applications. Accordingly, a relatively low cost, high bandwidth optical fiber system that is operational within a wide range of temperatures is desirable.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

Figure 1:
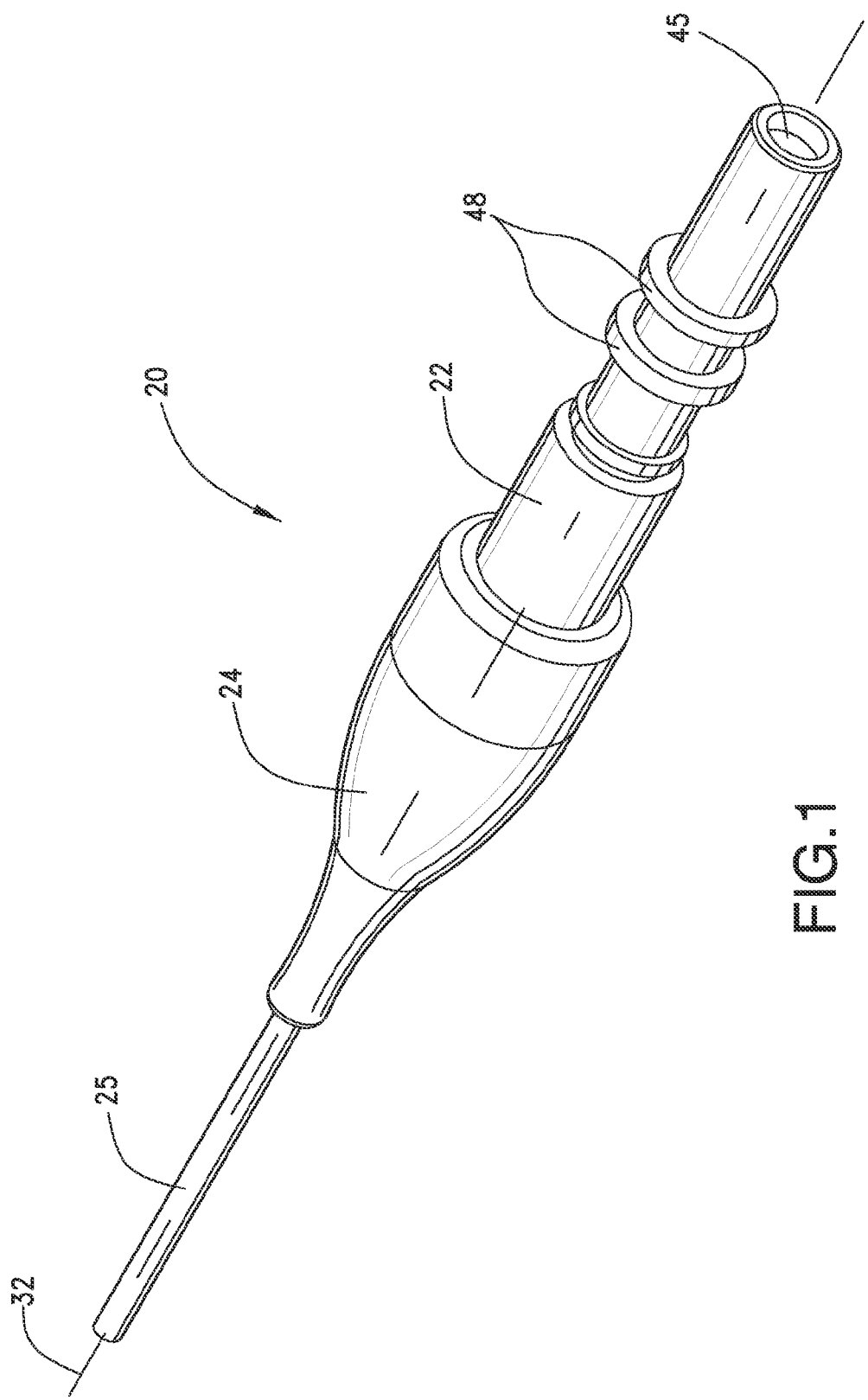
FIGS. 1-5 illustrate an embodiment of an optical fiber cable assembly with thermal expansion compensation capabilities.
Figure 2:
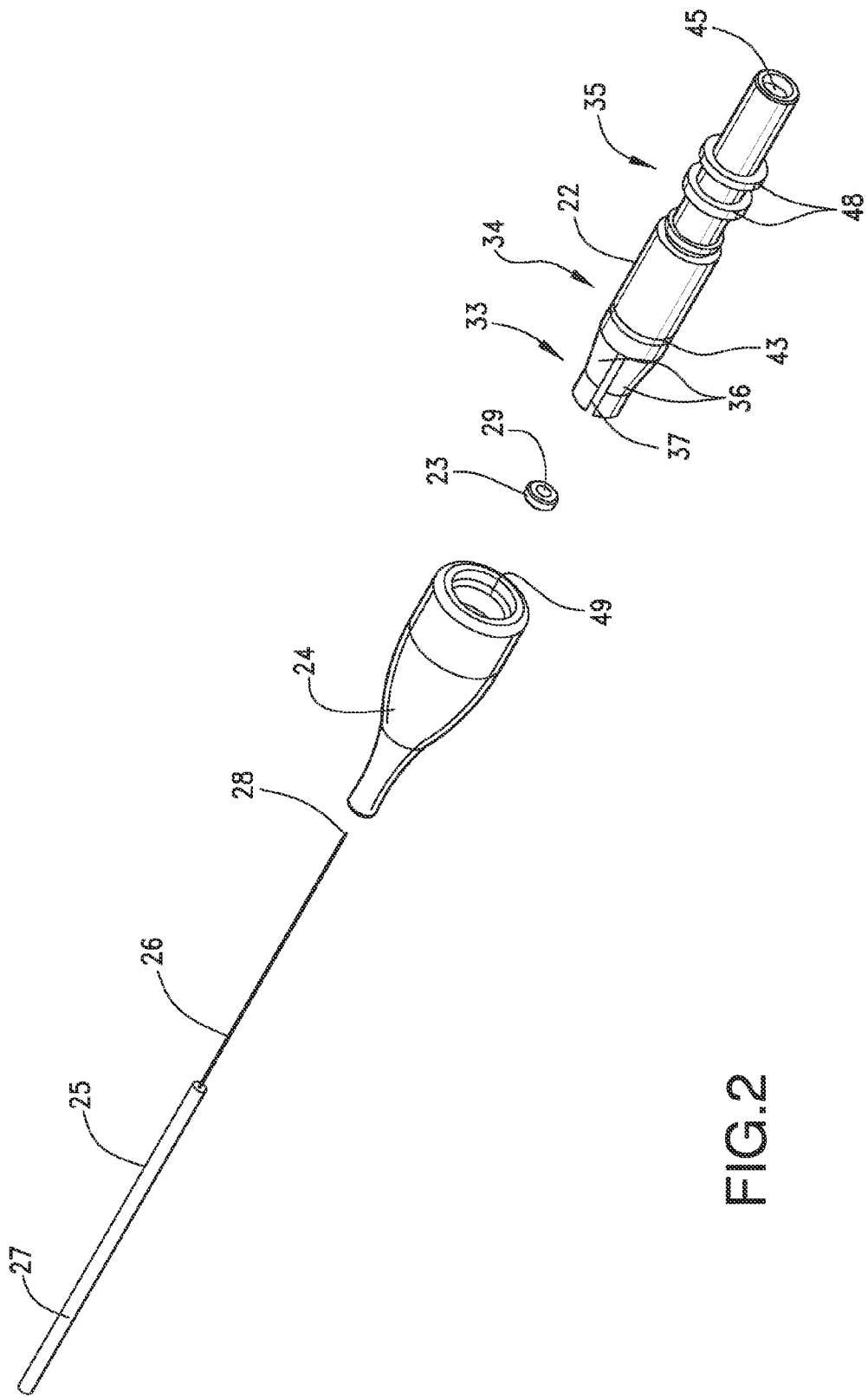

While the Present Disclosure may be susceptible to embodiment in different forms, there is shown in the Figures, and will be described herein in detail, specific embodiments, with the understanding that the disclosure is to be considered an exemplification of the principles of the Present Disclosure, and is not intended to limit the Present Disclosure to that as illustrated.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Referring to FIGS. 1-5, an optical fiber cable assembly 20 with thermal expansion compensation is illustrated. Optical fiber cable assembly 20 includes a lensed ferrule member 22 terminated to an optical fiber cable 25. Optical fiber cable 25 has a glass optical fiber 26 that includes a core and a cladding layer. An outer sheath or buffer 27 surrounds the optical fiber 26. A strength member, such as Kevlar®, may be provided between the optical fiber 26 and the buffer 27. A generally annular retaining or crimp ring 23 is secured to the optical fiber cable 25 and within the lensed ferrule member 22. A resilient boot 24 is positioned over a rear section 33 of lensed ferrule member 22 to seal the assembly and provide a strain relief.

Lensed ferrule member 22 is generally cylindrical and has a central bore extending partway through the ferrule member along a central axis 32. Lensed ferrule member 22 has a rear section 33, a central section 34 and a forward or mating section 35. Rear section 33 includes a plurality of resilient latching arms 36 that are spaced apart circumferentially about central axis 32 with longitudinal slots 37 between each pair of latching arms 36. Rear section 33 has a generally cylindrical bore 38 with a tapered lead-in section 39. The cylindrical bore 38 includes a generally annular inner recess 40 for lockingly receiving retaining ring 23 therein.

Central section 34 is generally cylindrical and has an outer annular recess 43 for lockingly receiving an annular ridge 49 positioned on an inner surface of boot seal 24. Central section 34 has a generally cylindrical inner bore 44 within which optical fiber 26 may move laterally as described in further detail below.

Forward section 35 is generally cylindrical and has a convex lens 45 integrally formed at the forward end thereof. If desired, the lens 45 may be a separate component. The forward section 35 has a generally tapered bore 46 that tapers from a diameter generally equal to that of inner bore 44 of central section 34 to a reduced diameter section 47 for aligning the forward end 28 of the optical fiber 26. Forward section 35 may have one or more annular projections 48 to assist in mounting the optical fiber cable assembly 20 as desired. Such annular projections 48 may be omitted and the outer surface of the forward section 35 may have other configurations or another shape if desired.

Figure 3:
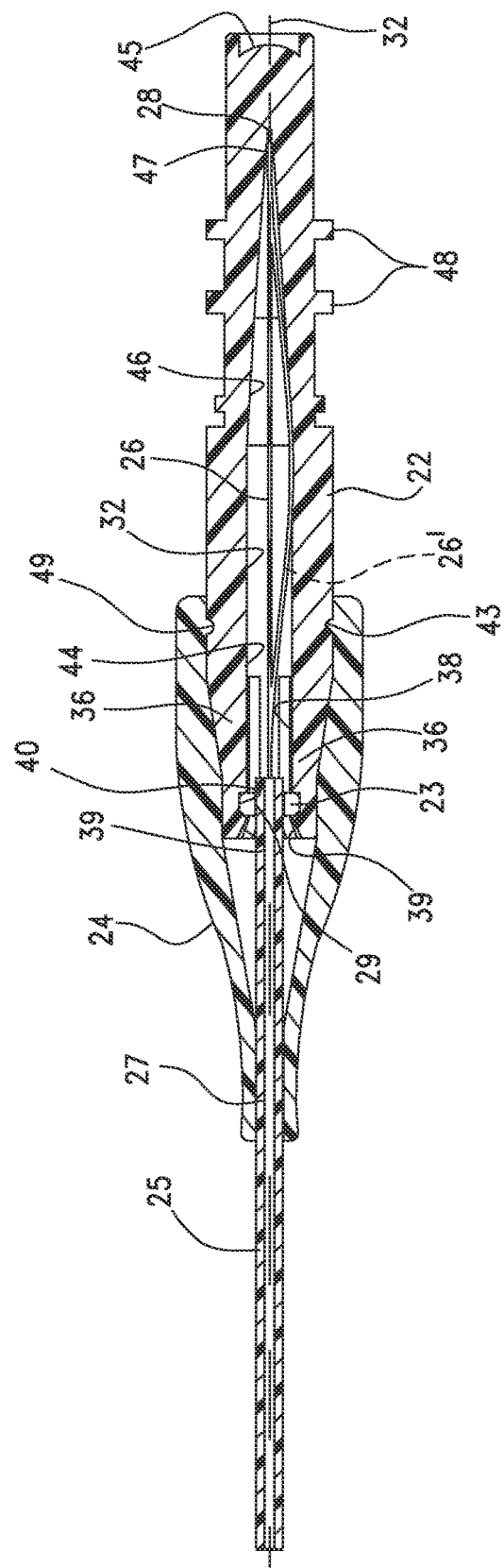

As best seen in FIG. 3, central bore of lensed ferrule member 22 includes sequentially the cylindrical bore 38 of rear section 33, the inner bore 44 of central section 34 and the tapered bore 46 of forward section 35. Central bore receives a stripped portion of the optical fiber 26 therein. The diameter of the central bore is sufficiently large so as to permit the optical fiber 26 to move laterally therein. In other words, the central bore is sufficiently large so as to permit the optical fiber 26 to laterally deflect and move away from the central axis 32 as depicted in phantom at 26' in FIGS. 3-5.

Lensed ferrule member 22 may be formed of an optical grade resin that is capable of being injection molded. If the lens 46 is integrally molded as part of the lensed ferrule member 22, the resin may be chosen to have a refractive index closely matching that of the optical fiber 26. In one example, the lensed ferrule member 22 may be made from Ultem® 2500. If the lens 45 is not integrally molded with the lensed ferrule member 22, the need for the resin of the lensed ferrule member to match the refractive index of the optical fiber 26 is eliminated. It would still likely be desirable for such a separate lens to match the refractive index of the optical fiber 26.

Generally annular retaining ring 23 has a cylindrical bore 29 for receiving optical fiber cable 25 therein. Retaining ring 23 may be made of a deformable material such as brass so as to permit the retaining ring to be crimped and secured the optical fiber cable 25. If desired, retaining ring 23 may be secured to optical fiber cable 25 in other manners such as an adhesive including an epoxy.

Boot 24 is a generally resilient, hollow member configured to slide over the rear section 33 of lensed ferrule member 22 and generally seal the assembly of the lensed ferrule member 22, the retaining ring 23 and the optical fiber cable 25. In addition, the boot 24 may act as a strain relief. Boot 24 has an annular projecting ridge or projection 49 along an inner surface thereof to lockingly engage the outer annular recess 43 of lensed ferrule member 22. The boot 24 may be made of a resilient material such as a rubber.

During assembly, the boot 24 is initially placed on the optical fiber cable 25. The retaining ring 23 may then be placed in an appropriate crimp tool and the optical fiber cable 25 fed through the central bore 29 of the retaining ring 23. The retaining ring 23 is secured to the optical fiber cable 25 such as by crimping and a predetermined length of the buffer 27 is removed to reveal a length of optical fiber 26. The optical fiber 26 is then cut to a predetermined length. Such cutting operation may be performed with a laser or a mechanical cleaving tool.

The assembly of the optical fiber cable 25 and the retaining ring 23 is moved relative to the lensed ferrule member 22 so that the assembly enters the central bore of the lensed ferrule member 22. As the assembly of the optical fiber cable 25 and the retaining ring 23 moves into the central bore, the end of the optical fiber 26 is guided by the tapered bore 46 towards the reduced diameter section 47 and the retaining ring 23 engages the tapered lead-in section 39 of the resilient latching arms 36. The resilient latching arms 36 deflect outward to permit the retaining ring 23 to pass into and be locked within the generally annular inner recess 40. The boot 24 is then slid along the optical fiber cable 25 towards the lensed ferrule member 22 until the annular projection 49 engages the outer annular recess 43 in the central section 34 of the lensed ferrule member 22.

In an environment such as within an engine compartment of a vehicle, optical fiber cable assembly 20 may be subjected to significant variations in temperature such as between −60° C. and +150° C. Due to the differences in the materials from which they are formed, lensed ferrule member 22 and the optical fiber 26 have different coefficients of thermal expansion and thus will expand and contract by different amounts. More specifically, the lensed ferrule member 22 is made of a resin and will generally tend to expand and contract to a much greater extent than the optical fiber 26 which is made of glass such as from silica. Accordingly, central bore of the lensed ferrule member 22 is dimensioned so as to be substantially larger than the diameter of the optical fiber 26 to permit movement of the optical fiber laterally relative to the central axis 32 of the optical fiber cable assembly 20. Since the optical fiber 26 is made of glass, its length will tend to be very stable regardless of temperature. The lensed ferrule member 26 will expand at high temperatures and contract at low temperatures to a much greater extent than the optical fiber 26.

In one example, the exposed length of optical fiber 26 is anticipated to be between 8 and 15 mm with a diameter of the central bore being approximately 1.5 mm. With such a configuration, it is anticipated that the distance between the forward end 28 of the optical fiber 26 and the retaining ring 23 may vary by approximately 20 microns as the optical fiber cable assembly 20 experiences thermal expansion throughout the temperature range of −60° C. to +150° C. Configuring the diameter of the central bore to be approximately 1.5 mm is anticipated to be sufficient to permit deflection of the optical fiber 26 away from the central axis 32 so as to permit compensation for the thermal expansion of the optical fiber cable assembly.

Figure 4:
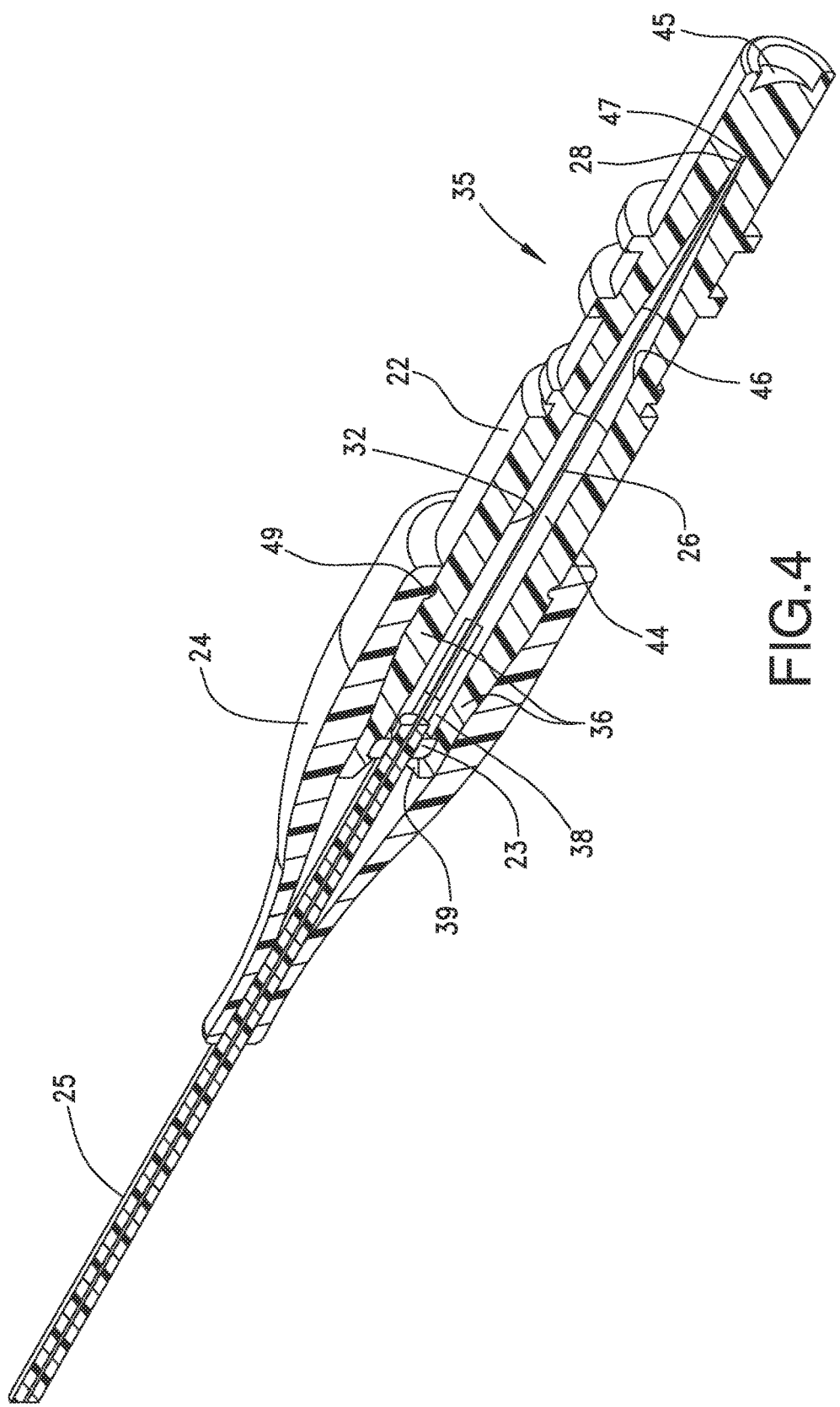
Figure 5:
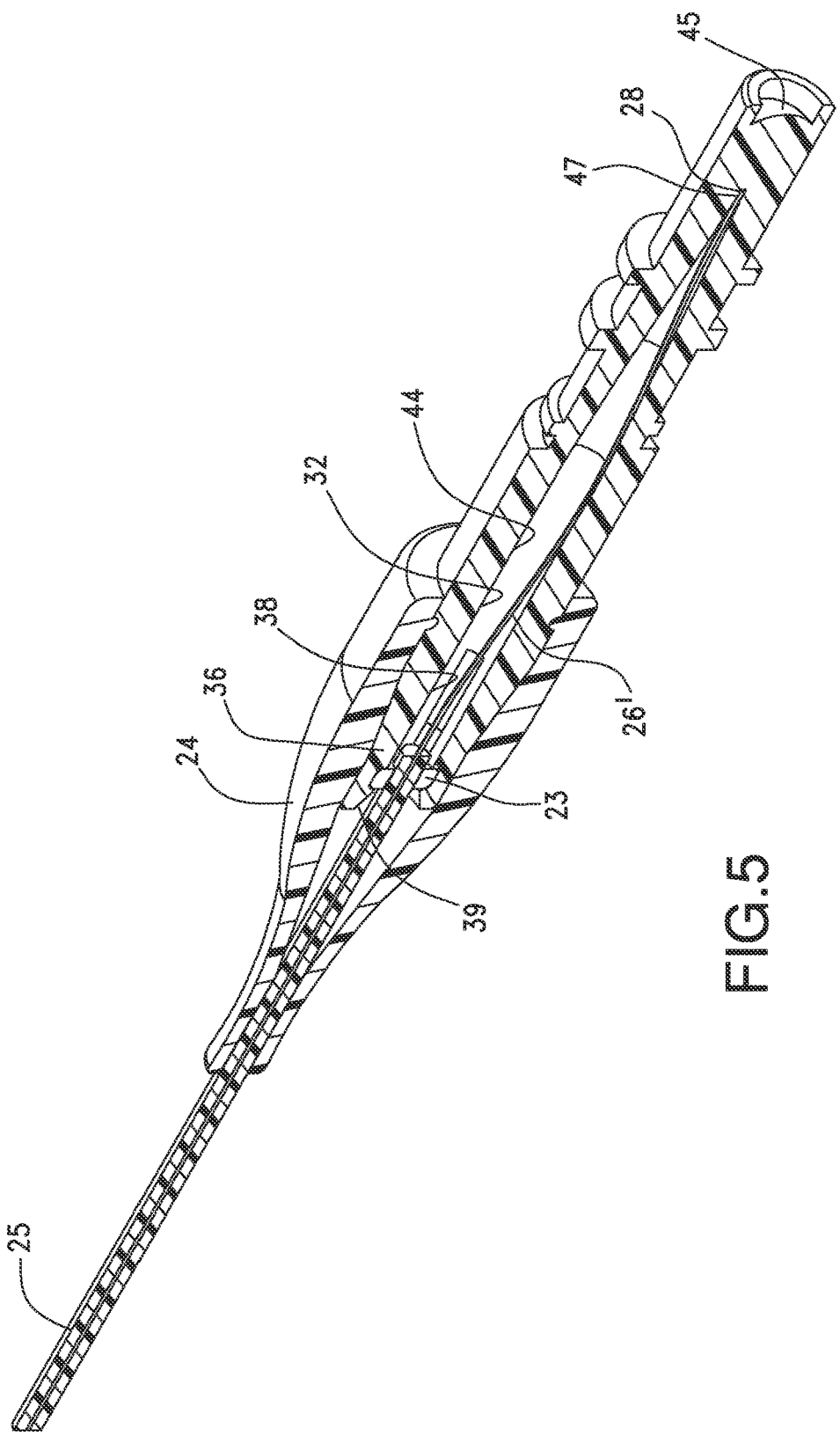
Figure 6:
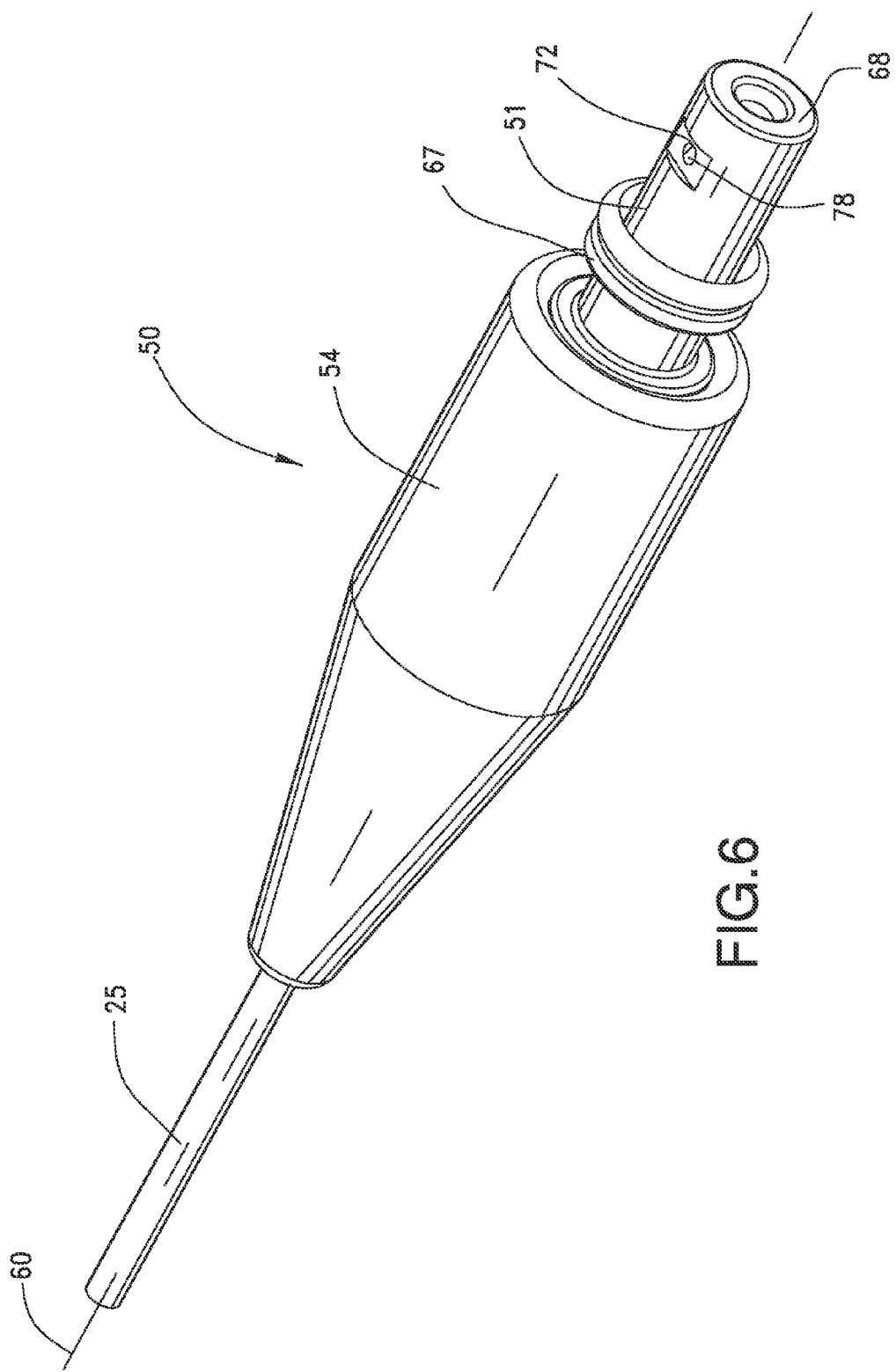
FIGS. 6-9 illustrate a second embodiment of an optical fiber cable assembly with thermal expansion compensation capabilities.

In FIGS. 3-4, the optical fiber 26 is depicted by a "solid" line when the lensed ferrule member 22 is expanded sufficiently so that the optical fiber may extend to its normal length along central axis 32. As the operating temperature decreases, the lensed ferrule member 22 will contract. The optical fiber 26 is secured between the reduced diameter bore 47 and the retaining ring 23 so that the optical fiber is placed in compression while the lensed ferrule 22 contracts. However, since the optical fiber 26 is unsupported within the central bore of the lensed ferrule member 22, the optical fiber 26 may deflect away from the central axis 32 and within the central bore as depicted in phantom at 26' while the forward end 28 of the optical fiber 26 remains at the reduced diameter bore 47. In such a configuration, compensation for differences in thermal expansion between the lensed ferrule member 22 and the optical fiber 26 may be achieved without degrading the performance of the optical fiber cable assembly 20. It should be noted that, for clarity, the different lengths (expanded and contracted) of the lensed ferrule member 22 are not depicted. In practice, when the lensed ferrule member 22 is in the contracted position and the optical fiber 26' moved laterally from the central axis 32, the lens 45 would be moved closer towards retaining ring 23 than that depicted in FIGS. 3-5.

A second embodiment of an optical fiber cable assembly 50 with thermal expansion compensation is depicted in FIGS. 6-9. Optical fiber cable assembly 50 includes a lensed ferrule member 51 terminated to the optical fiber cable 25. Optical fiber cable 25 is configured in a manner similar to that of the embodiment of FIGS. 1-5 but has a shorter length of buffer 27 stripped therefrom so as to leave a shorter length of exposed optical fiber 26. Retaining or crimp ring 53 is secured to the optical fiber cable 25 and the lensed ferrule member 51. A resilient boot 54 is positioned over a rear section 55 of lensed ferrule member 51 and the retaining ring 53 to seal the assembly and provide a strain relief lensed ferrule member 51.

Figure 8:
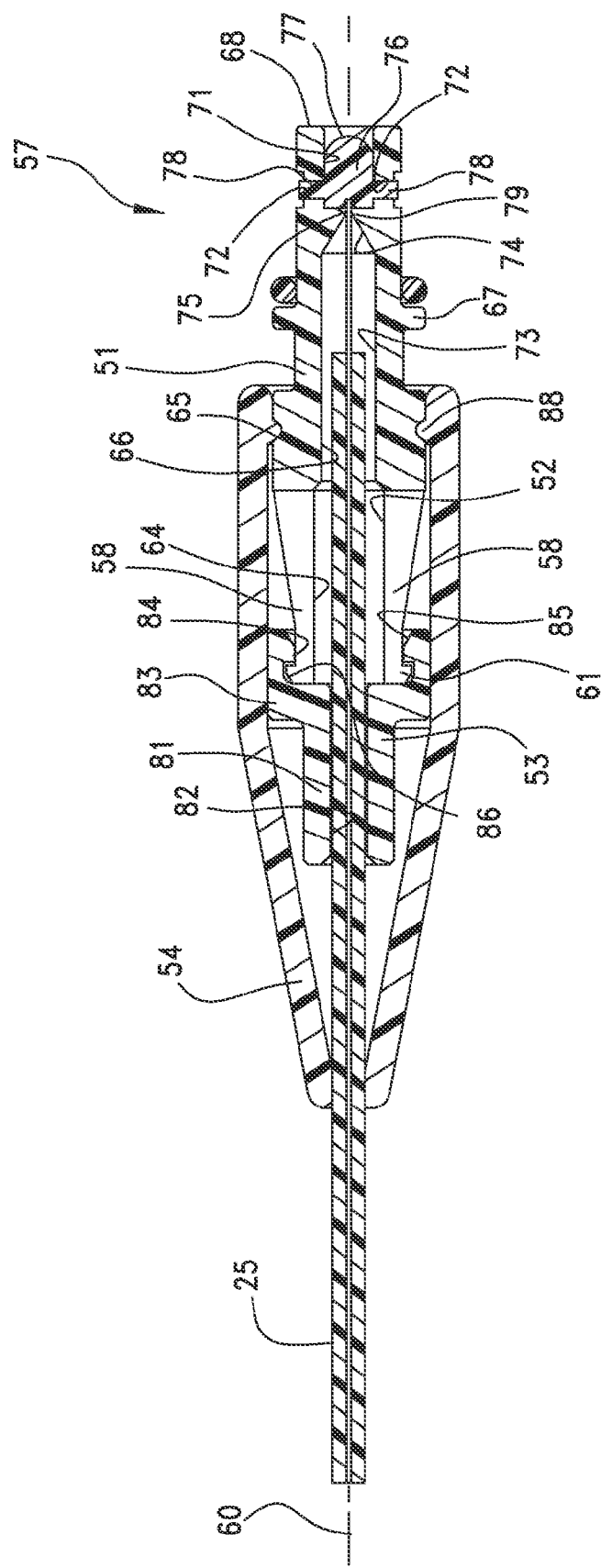
Figure 9:
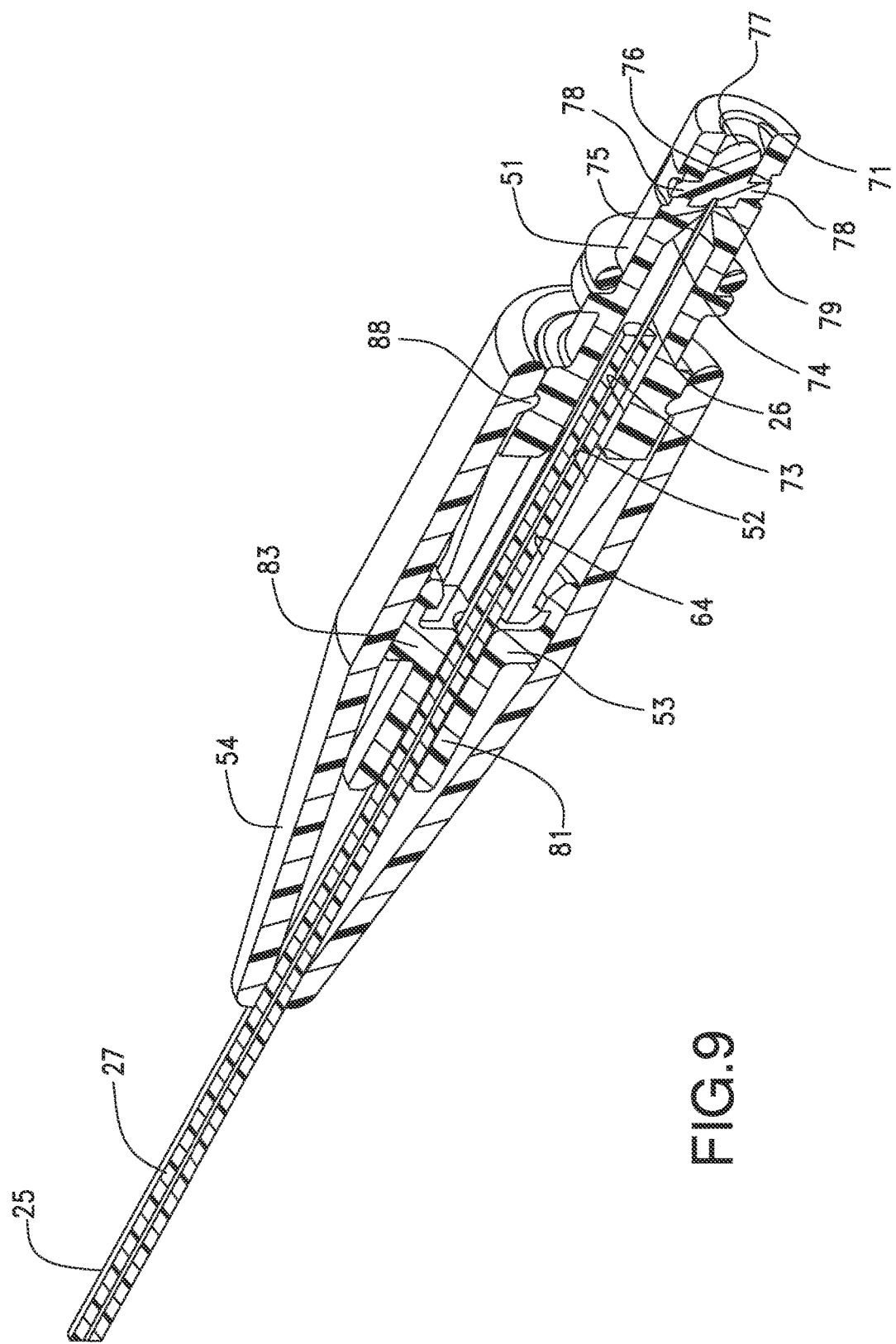
Figure 10:
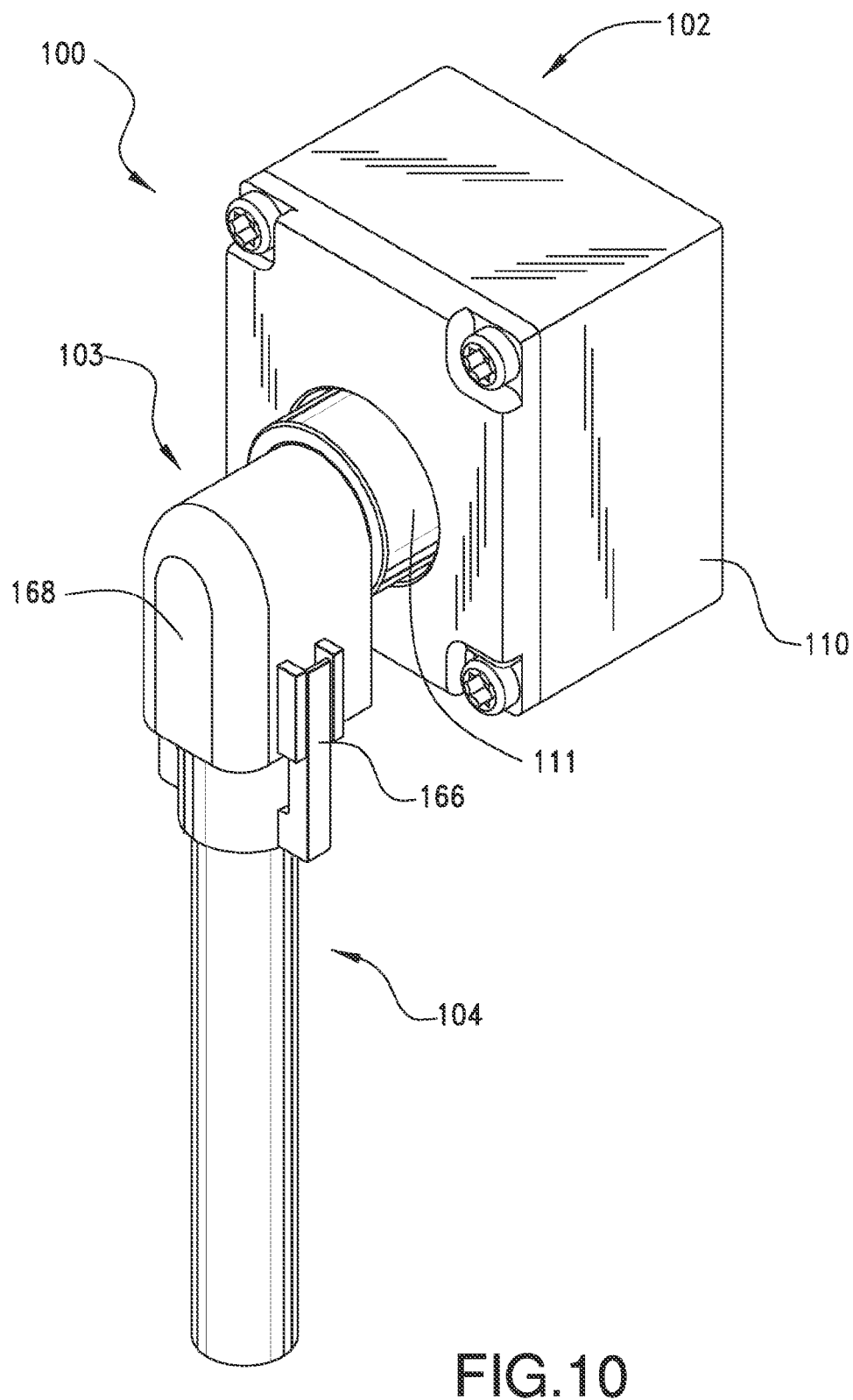
FIGS. 10-21 illustrate an embodiment of a system for high bandwidth signal transmission.
Figure 12:
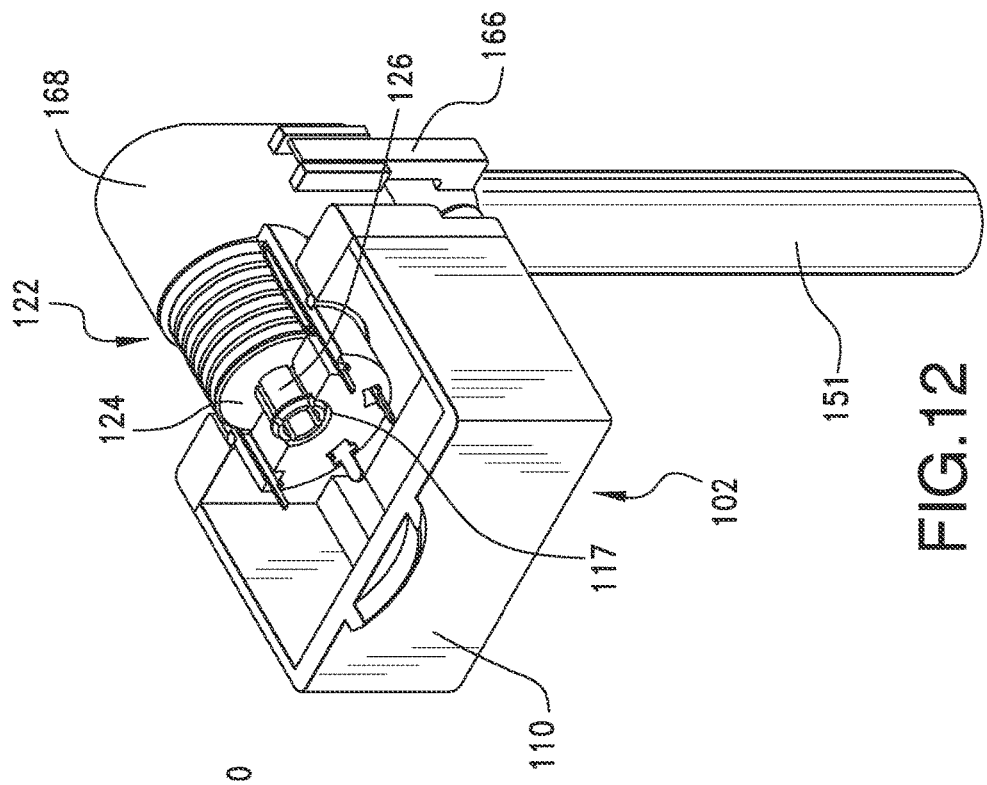
Figure 11:
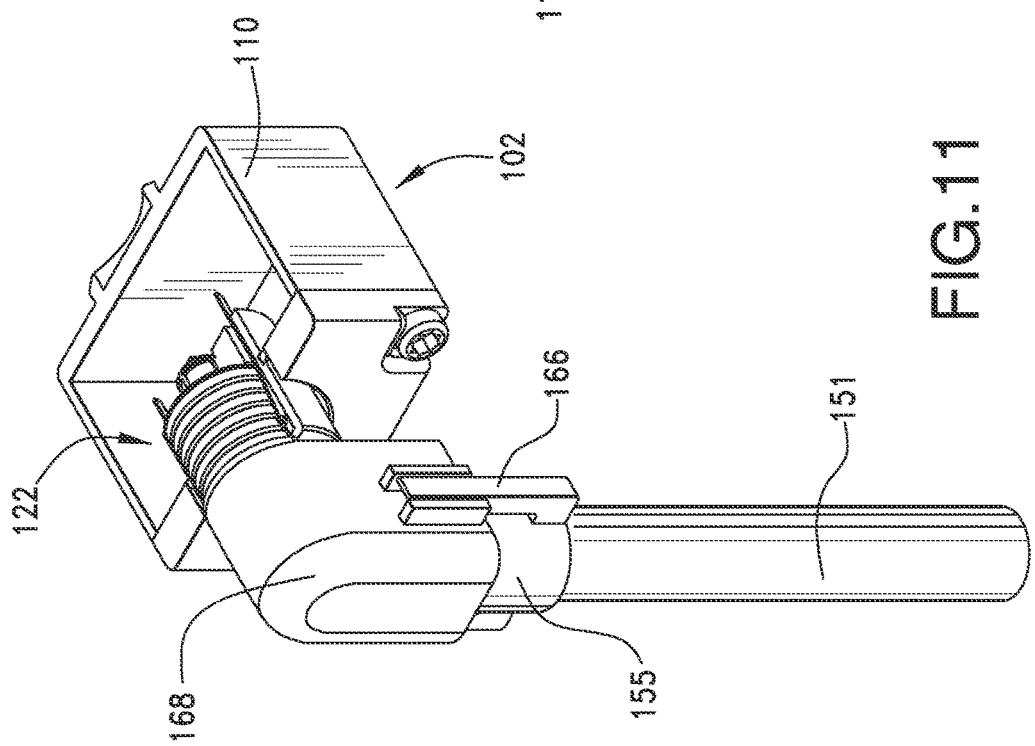
Figure 13:
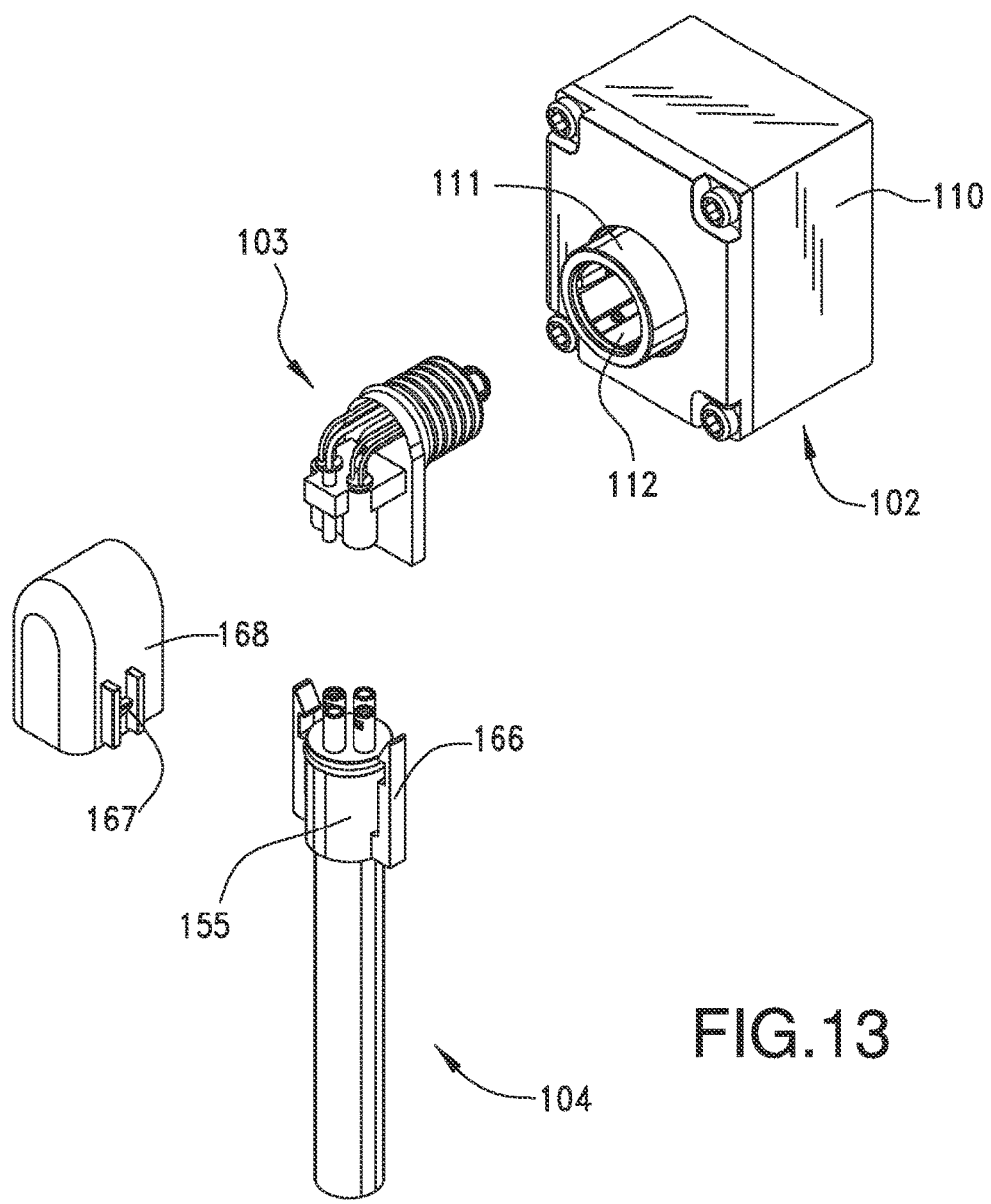
Figure 14:
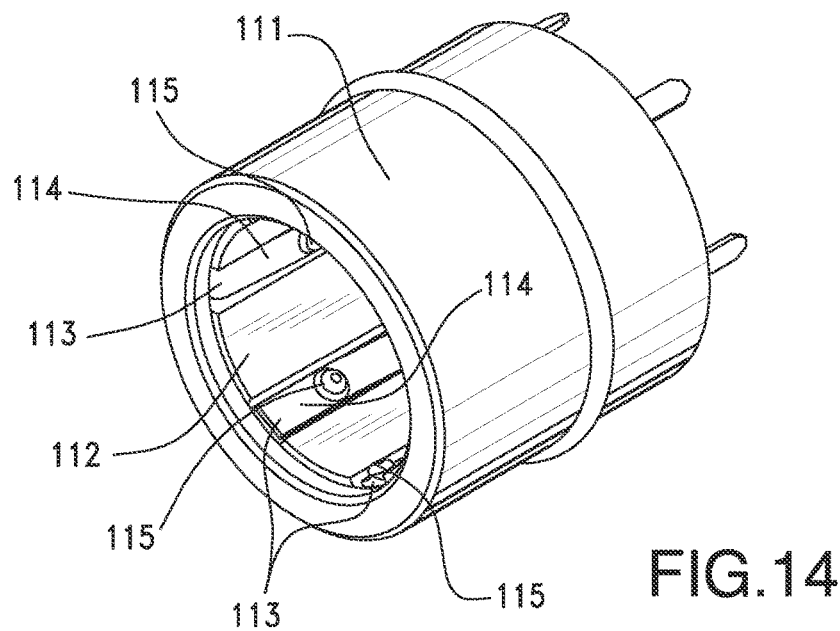
Figure 15:
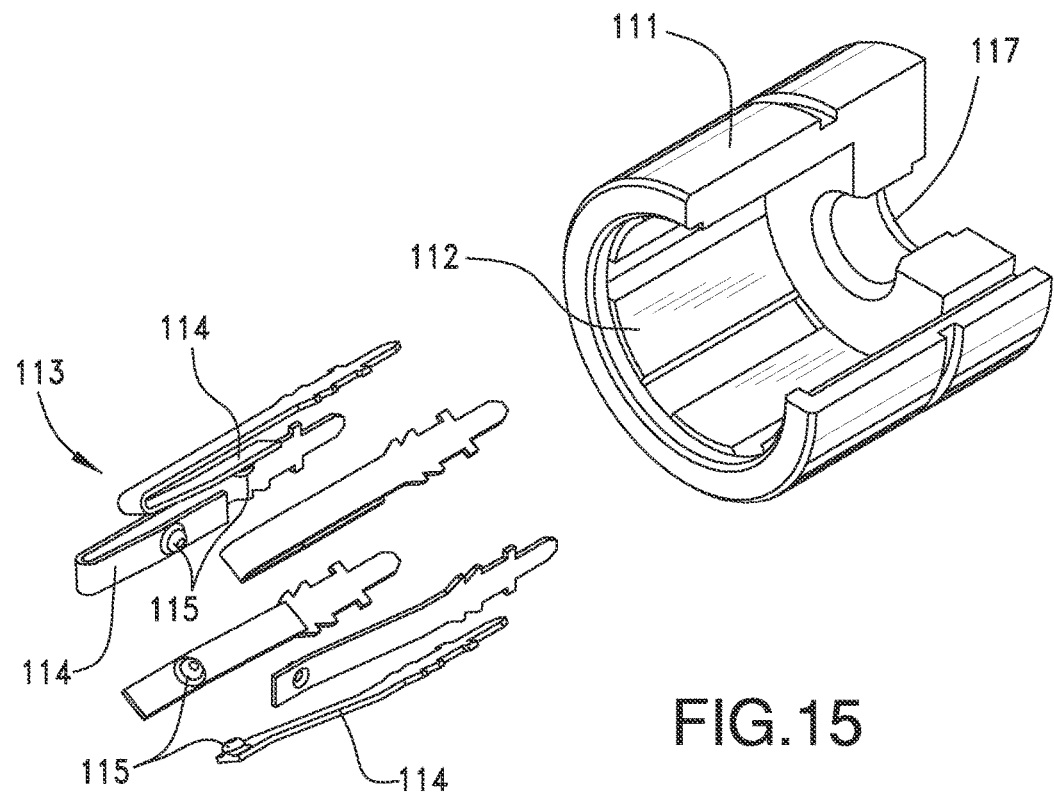
Figure 16:
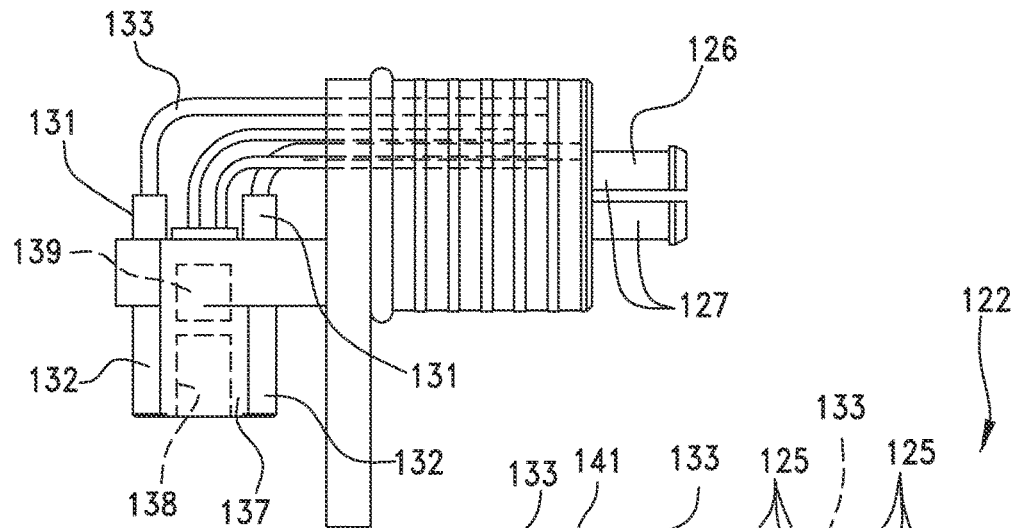
Figure 18:
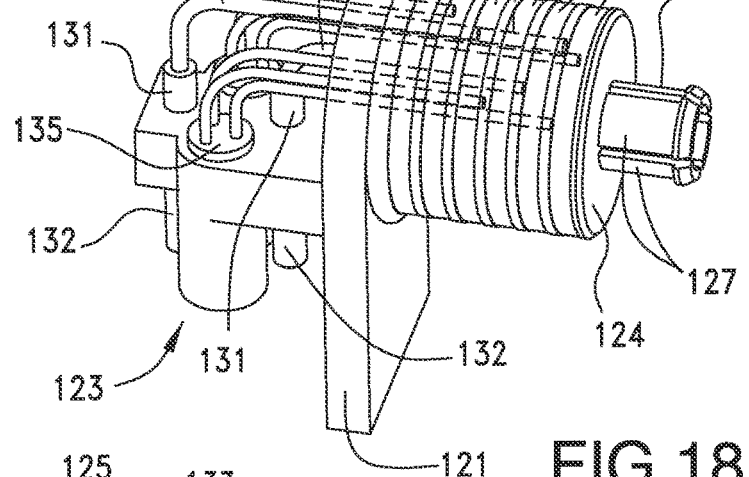
Figure 17:
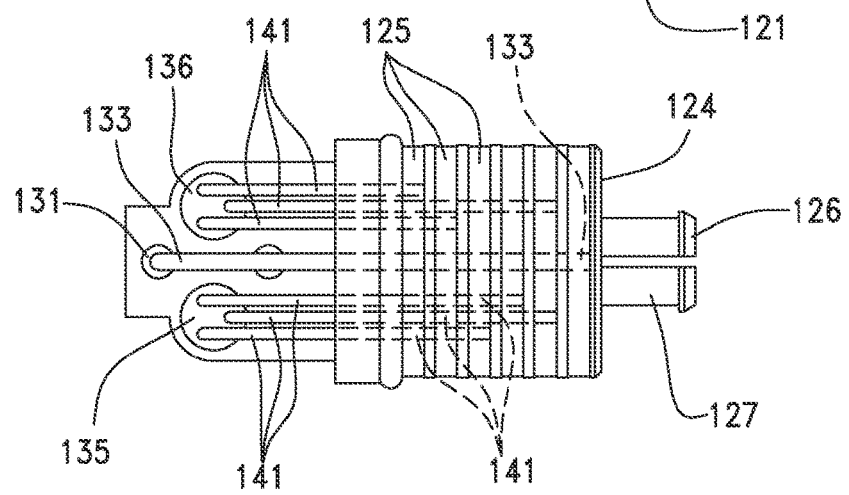
Figure 19:
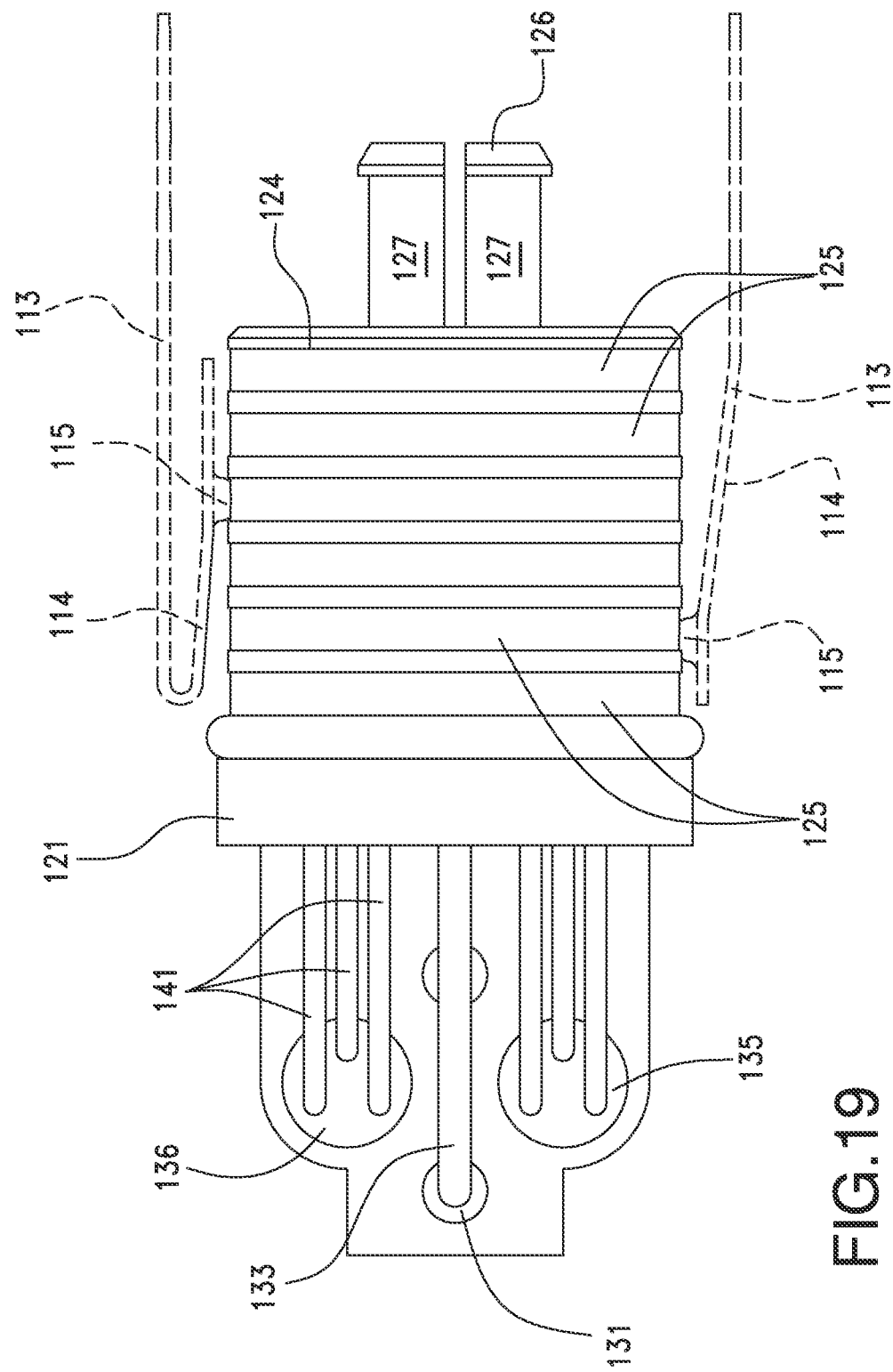
Figure 20:
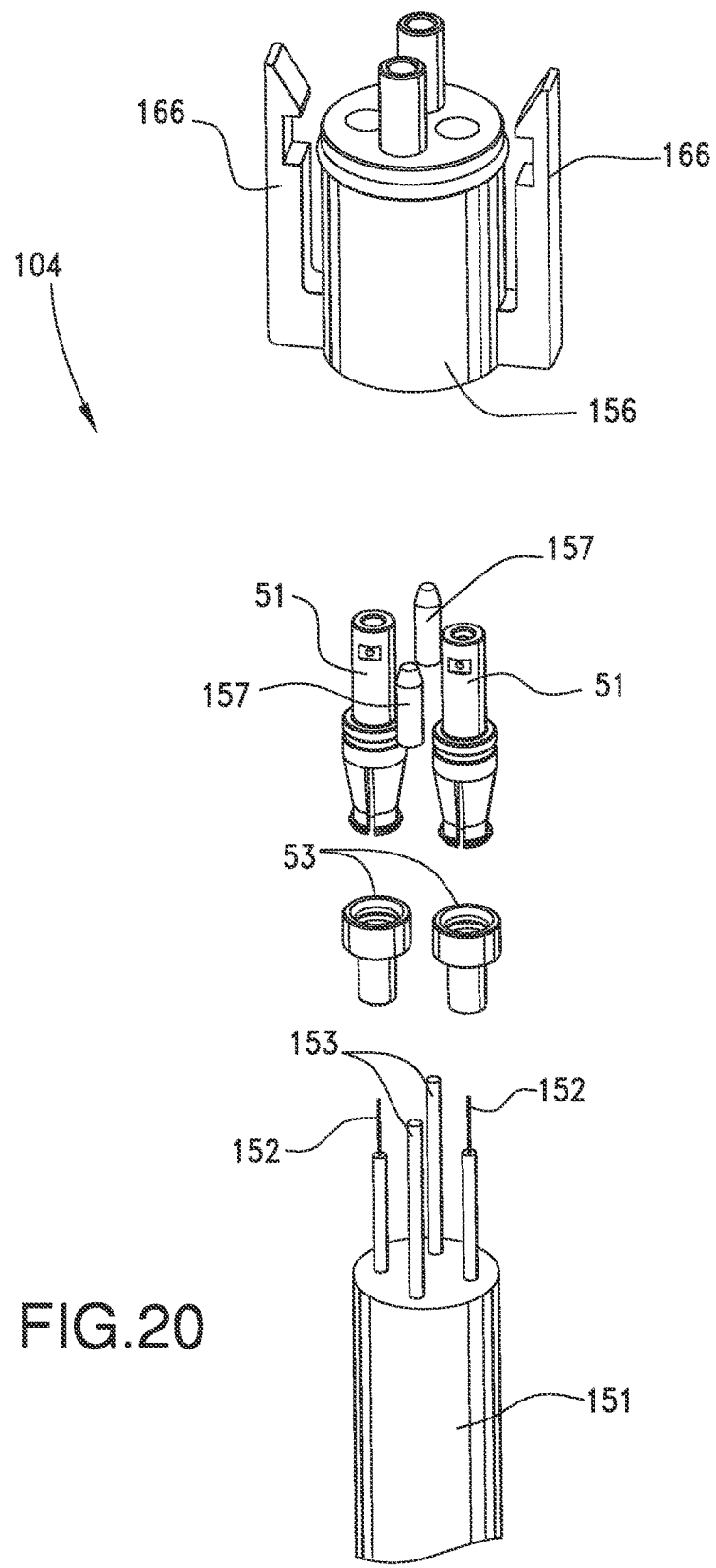
Figure 21:
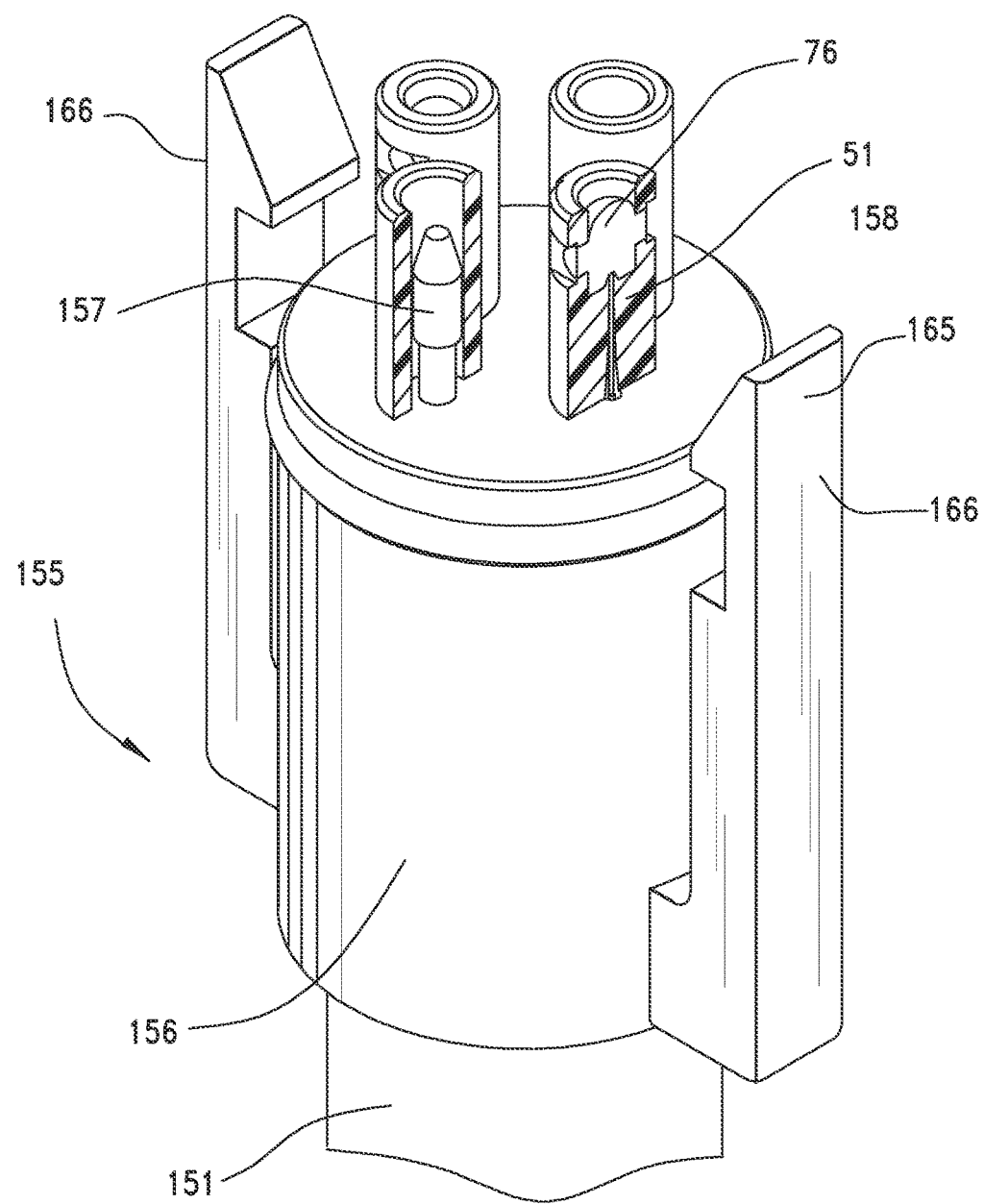

Lensed ferrule member 51 is generally cylindrical and has a central bore 52 extending through the ferrule member along a central axis 60. Lensed ferrule member 51 includes a rear section 55, a central section 56 and forward or mating section 57. The rear section 55 has a plurality of resilient latching arms 58 that are spaced apart circumferentially about central axis 60 with longitudinal slots 59 positioned between each of the resilient latching arms 61. Each of the resilient latch arms 58 has a raised outer edge 61 that collectively combine to form a generally circular locking ring 62. Referring to FIGS. 8-9, it can be seen that rear section 55 has cylindrical bore 64 therein.

Central section 56 is generally cylindrical and has an outer annular recess 65 for securing the lensed ferrule member 51 to the boot 54. Central section 56 has a generally cylindrical bore 66.

Forward section 57 is generally cylindrical and has a stepped inner bore formed of a series of passages and that extends through the entire length thereof. The forward section has a forward end 68 with a generally cylindrical forward passage 71 that extends rearwardly towards the central section 56 until it reaches a rearward wall 79. A pair of lateral openings 72 extend from the outer surface of the forward section 57 and intersect with the forward passage 71 at a position slightly forward of the rearward wall 79.

The forward section 57 has a generally cylindrical passage 73 adjacent the central section 56 that is configured as an extension of bore 66. As the bore approaches the rearward wall 79, it tapers so as to form a tapered passage 74 that leads to an optical fiber passage 75. Optical fiber passage 75 is positioned along central axis 60 and extends through rearward wall 79 to connect the forward passage 71 with the tapered passage 74. Tapered passage 74 and optical fiber passage 75 are configured to guide the optical fiber to the central axis 60 as it approaches forward passage 71. Forward section 57 may have an annular projection 67 to assist in mounting the optical fiber cable assembly 50 as desired. Such annular projection 67 may be omitted and the outer surface of the forward section 57 may have other configurations or another shape if desired.

As best seen in FIGS. 8-9 central bore 52 of lensed ferrule member 51 includes sequentially the cylindrical bore 64 of rear section 55, the cylindrical bore 66 of central section 56 and the cylindrical passage 73, the tapered passage 74, the optical fiber passage 75 and the forward passage 71 of the forward section 57. Central bore 52 receives a length of optical fiber cable 25 therein as well as a length of stripped optical fiber 26. The diameters of the cylindrical bore 64 of rear section 55, the cylindrical bore 66 of central section 56 and the cylindrical passage 73 of forward section 57 are sufficiently large so as to permit the optical fiber cable to be positioned therein. The optical fiber passage 75 is dimensioned to permit the optical fiber 26 to pass therethrough and maintain the optical fiber along central axis 60. Lensed ferrule member 51 may be formed of a resin that is capable of being injection molded.

A resilient lens 76 is insert molded within forward passage 71 and is configured with a convex forward surface 77 and otherwise fills forward passage 71 and lateral openings 72 with the resilient lens material. The resilient lens material fills the lateral openings 72 in the lensed ferrule member 51 with legs 78 that function (after the molding process) to retain the resilient lens 76 within the forward passage 71. During the molding process, one leg 72 may act as an inlet for the lens material while the other leg acts as an outlet. As a result, the likelihood of air being trapped within the forward passage 71 may be reduced and thus increase the performance of the resilient lens 76. Resilient lens 76 may be made of an optical grade resilient material that is capable of being injection molded with a refractive index closely matching that of the optical fiber 26. In one example, the resilient lens may be made of silicone.

In an alternative design, the resilient lens may be molded separately from the lensed ferrule member 51 and inserted into the forward passage 71. Still further, such separate lens (not shown) may have protrusions that engage the lateral openings 72 to secure the lens within forward passage 71. Still further, such separate lens (not shown) may also have an end portion extending beyond the forward end 68 of the lensed ferrule member 51. In such a configuration, the elastic face of the lensed ferrule member 51 will drive a backward Z-axis force. This Z-axis force will drive the profile of the lensed ferrule member 51 to a known stop within its enclosure. Accordingly, to achieve this elastic face, it is possible to have a separate element placed between the two opposing ferrules acting as a spring member; the end portion extending beyond the forward end 68 of the lensed ferrule member 51. As an alternative approach, an integration of the elastic face can be formed from the same process as the formation of the silicone lens of the ferrule. In either event, this configuration serves the desire of having a ferrule assembled in its housing to be biased in the Z-axis direction, such that a known distance between the ferrule and the opposing ferrule, when both are mated, is driven to a known orientation with each other.

The retaining ring 53 has a generally cylindrical stepped configuration. A rearward section 81 has a cylindrical bore 82 dimensioned to receive the optical fiber cable 25 therein. A forward section 83 has an outer diameter larger than that of rearward section 81. The forward section 83 has an enlarged bore 84 for receiving the ends 61 of the latch arms 58 of the lensed ferrule member 51. The enlarged bore 84 may have a tapered leading edge 85 and an annular recess 86 between the rear portion 81 and the tapered leading edge 85. The annular recess 86 is dimensioned to lockingly receive the locking ring 62 formed by the raised outer edges 61 of the resilient spring arms 58 of the ferrule member 51. The retaining ring 53 may be formed of a deformable material such as brass so as to permit the retaining ring to be crimped and secured to optical fiber cable 25. If desired, retaining ring 53 may be secured to optical fiber cable 25 in other manners such as an adhesive including an epoxy.

Boot 54 is a generally resilient, hollow member configured to slide over the rear section 55 of lensed ferrule member 51 and generally seal the assembly of the lensed ferrule member 51, the retaining ring 53 and the optical fiber cable 25. In addition, the boot 54 may act as a strain relief. Boot 54 has an annular projecting ridge or projection 88 along an inner surface thereof to lockingly engage the outer annular recess 65 of lensed ferrule member 51. The boot 54 may be made of a resilient material such as rubber.

During assembly, the boot 54 is initially placed on the optical fiber cable 25. The retaining ring 53 may then be placed in an appropriate crimp tool (not shown) and the optical fiber cable 25 fed through the bore 82 and bore 84 of the retaining ring 53. The retaining ring 53 is secured to the optical fiber cable 25 such as by crimping and a predetermined length of the buffer 27 is removed to reveal a length of optical fiber 26. The optical fiber 26 is then cut to a predetermined length. Such cutting operation may be performed with a laser or a mechanical cleaving tool.

The assembly of the optical fiber cable 25 and the retaining ring 53 is moved relative to the lensed ferrule member 51 so that the assembly enters the central bore 52 of the lensed ferrule member 51. As the optical fiber 26 enters the optical fiber bore 75, the resilient arms 58 of the lensed ferrule member 51 engage the tapered leading edge 85 of the retaining ring 53 to deflect the resilient arms inward. Once the raised outer edges 61 of the resilient arms 58 are aligned with the annular recess 86 of the retaining ring 53, the resilient arms snap outward with the edges 61 engaging the annular recess 86 to secure the lensed ferrule member 51 to the retaining ring 53. The boot 54 is then slid along optical fiber cable 25 and over the assembly of the lensed ferrule member 51 and the retaining ring 53 until the annular projection 88 of the resilient boot 54 engages the outer annular recess 65 of the central section 56 of the lensed ferrule member 51.

Differences in thermal expansion between the optical fiber 26 and the lensed ferrule member 51 are overcome by the resiliency of the lens 76. The optical fiber cable assembly 50 is configured so that the forward end 28 of the optical fiber 26 engages a rear surface 89 of the lens 76 with sufficient force so as to provide the desired optical transmission when the optical fiber cable assembly 50 is at the high end of its expected temperature range. As the optical fiber cable assembly 50 encounters temperatures lower than such high end of the temperature range, the lensed ferrule member 51 will contract while the optical fiber 26 will generally remain the same length. As the lensed ferrule member 51 contracts, the forward passage 71 will move rearwardly towards retaining ring 53 and thus shortening the distance between the retaining ring 53 and the rear surface 89 of the resilient lens 76. Since the length of the optical fiber 26 will not significantly change, the forward end 28 of the optical fiber 26 will be pressed further into and further deform the rear surface 89 of the resilient lens. Despite the deflection of the rear surface 89 of the resilient lens, the desired optical transmission characteristics will be maintained. It is anticipated that for a temperature range of −60° C. to +150° C., the rear surface 89 of the lens may move approximately 20 microns along the central axis 60.

It should be noted that each of the optical fiber cable assembly 20 and the optical fiber cable assembly 50 include components that may be modified without significantly affecting the thermal expansion compensation aspects of the cable assemblies. For example, the optical fiber cable assembly 20 and the optical fiber cable assembly 50 utilize different configurations for retaining the optical fiber cable 25 within the respective lensed ferrule assemblies. More specifically, the retaining ring 23 of optical fiber cable assembly 20 slides into resilient latching arms 36 of lensed ferrule member 22 while the retaining ring 53 of optical fiber cable assembly 50 slides over the resilient latching arms 58 of the lensed ferrule member 51. Each configuration for securing the optical fiber 25 to the lensed ferrule members may be used with either cable assembly. In addition, it is anticipated that other manners of securing the optical fiber cable 25 to the lensed ferrule members will be used. Still further, the outer configuration of the forward section of each of the lensed ferrule members may be modified without significantly affecting the thermal expansion compensation capabilities of the optical fiber cable assemblies.

Optical fiber cable assembly 20 compensates for differences between the thermal expansion of the lensed ferrule member 22 and the optical fiber 26 along the central or longitudinal axis 32 by permitting lateral deflection of the optical fiber 26 within the central bore. In other words, optical fiber cable assembly 20 compensates for the thermal expansion through lateral deflection of the optical fiber 26. Optical fiber cable assembly 50 compensates for the differences in thermal expansion between the optical fiber 26 and the lensed ferrule member 51 by providing a resilient lens 76 that is deflected along the central axis 60. In other words, optical fiber cable assembly 20 compensates for the thermal expansion through lateral deflection of the optical fiber 26 while the optical fiber cable assembly 50 compensates for the thermal expansion through longitudinal deflection of the resilient lens 76.

Referring to FIGS. 10-21, a system 100 for high bandwidth signal transmission from an electronic device (not shown) such as a digital camera, a DVD player, a control system or an engine management system is depicted. System 100 includes a device subassembly 102, a transceiver subassembly 103 connected to the device subassembly 102, and a cable assembly 104 connected to the transceiver subassembly 103. Device subassembly 102 may include any type of electronic device (not shown) for which it would be beneficial to transmit and/or receive high quantities of digital signals. Device subassembly 102 may have any shape but is depicted as being generally rectangular with a housing 110 having a generally circular connector 111 mounted thereon.

Circular connector 111 has a generally circular opening 112 for receiving a mating connector and has a plurality of electrically conductive resilient terminals 113 that extend into the circular opening 112. Each terminal 113 has a contact arm 114 with a projection or dimple 115 for contacting a conductive contact 125 of the mating connector. It should be noted that the dimples 115 of the conductive terminals 113 may be spaced different distances from the mating edge 116 of the circular connector as described in further detail below. Terminals 113 of circular connector 111 are electrically connected to the electronic component (not shown) within the housing 110 and may be so connected through a circuit board (not shown) such as by soldering.

Transceiver subassembly 103 has a housing 121 including a device connection end 122 and a cable connection end 123. The device connection end has a cylindrical projection 124 with a plurality of spaced apart, circumferential conductive rings that function as separate circumferential contacts 125. The projection 124 and its contacts 125 function as a conductive slip-ring that interacts with the terminals 113 of circular connector 111 to form a rotatable connector. The housing end 122 may have a locking projection 126 with a plurality of resilient locking arms 127 that lockingly engage a shoulder 117 of circular connector 111 to lock the transceiver subassembly 103 to the circular connector 111 of device subassembly 102.

The cable connection end 123 of transceiver subassembly 103 has a pair of electrical power terminals 131, a transmitter optical subassembly (TOSA) 135, and a receiver optical subassembly (ROSA) 136. Each power terminal 131 has an electrically conductive contact 132 for removably connecting to a mateable terminal 157 of the connector assembly 155 of cable assembly 104. A conductive lead 133 extends from each contact 132 and is electrically connected to one of the circumferential contacts 125 located on the cylindrical projection 124 of the housing 121.

The TOSA 135 has an optical interface 139 together with circuitry (not shown) for converting electrical signals into optical signals. Three conductive leads 141 extend from the TOSA 135 into the cylindrical projection 124 of housing 121 and are electrically connected to circumferential contacts 125 located on the cylindrical projection 124. It should be noted that one of the leads 141 of the TOSA 135 may be electrically connected to the same circumferential contact 125 as the lead 132 of one of the power terminals 131. This configuration may be used to provide power to the electronic device within housing 110 as well as the TOSA 135 and the ROSA 136. The TOSA 135 may have a generally cylindrical adapter 137 with a generally cylindrical bore 138 for receiving a mating optical component such as optical fiber connector 158 of cable assembly 104.

The optical interface of the TOSA 135 may take a variety of forms. In the embodiment depicted in FIGS. 10-21, the optical interface is an expanded beam optical interface in which lenses are used to expand and contract the light at the mating interface. More specifically, expanded beam connectors expand the width of the optical beam and transmit the expanded beam over an air gap between the connectors. By expanding the beam, the relative size difference between any dust or debris and the beam is increased and thus reduces the impact on the efficiency of any of the dust or debris as well as any misalignment of the connectors. After the optical beam passes through the air gap, a second lens contracts or refocuses the beam onto the optical fiber.

The ROSA 136 is configured in a manner substantially identical to the TOSA 135 except that it operates to receive optical signals and convert them into electrical signals. In other words, the TOSA 135 and ROSA 136 are physically configured in a similar manner within the transceiver subassembly 103 but have generally opposite functionalities. Common elements thereof are not described herein and share common reference numbers. The TOSA 135 and ROSA 136 may be replaced by a single transceiver unit (not shown) if desired. In addition, if transmission is only required in one direction, only a single TOSA 135 or ROSA 136 may be used.

Cable assembly 104 is depicted as a hybrid cable 151 with two optical fibers 152 and two electrically conductive wires 153 therein. Cable 151 may have a protective sheath 154 surrounding the outer surface thereof. Cable 151 is terminated to a connector assembly 155. Connector assembly 155 has a housing 156 that supports two electrical terminals 157 and two optical fiber connectors 158. The electrical terminals 157 are terminated to the electrically conductive wires 153. The optical fiber connectors 158 are terminated to the optical fibers 152. As depicted herein, the optical fiber connectors 158 may be the thermal expansion compensation connectors terminated to the optical fiber cable assemblies 20, 50 depicted in FIGS. 1-9 above. In the alternative, the optical fiber connectors may be other types of connectors, whether expanded beam or otherwise. In some circumstances, it may be desirable to utilize plastic optical fiber instead of the glass optical fiber 152.

Connector assembly 155 has a latch 165 to releasably latch the connector assembly 155 to the transceiver subassembly 103. The latch 165 has a pair of deflectable beams 166 that engage a ledge 167 of cover 168 to secure the connector assembly 155 and thus cable assembly 104 to the transceiver subassembly 103.

The device subassembly 102 is assembled by mounting the electronic device (not shown) within the housing 110 with the circular connector 111 electrically connected to the electronic device through conductive terminals 113. Transceiver subassembly 103 is assembled by mounting each of the power terminals 131 on housing 121 with the lead 133 of each power terminal 131 extending into cylindrical projection 124. Each lead is electrically connected to one of the circumferential contacts 125 of each cylindrical projection. Each of the TOSA 135 and the ROSA 136 is mounted on housing 121 with the leads 141 from each of the TOSA 135 and the ROSA 136 extending into cylindrical projection 124. Each lead is electrically connected to the circumferential contacts 125 of the cylindrical projections 124.

Cable assembly 104 is assembled by stripping predetermined lengths of a sheath from the optical fibers 152 and the electrically conductive wires 153 of cable 151. The electrical terminals 157 are terminated to the electrically conductive wires 153. The optical fibers 152 are terminated to the optical fiber connectors 158. The terminated electrical terminals 157 and optical fiber connectors 158 may then be mounted within housing 156 and the housing secured to cable 151.

To interconnect the transceiver subassembly 103 to the device subassembly 102, the cylindrical projection 124 of the transceiver subassembly 103 is inserted into the cylindrical opening 112 of the circular connector 111 so that the circumferential contacts 125 engage the terminals 113 of the circular connector 111. The staggered dimples 115 of the terminals 113 permit each terminal 113 to engage a single circumferential contact 125 aligned with that terminal. Locking projection 126 extends through the end of the cylindrical opening 112 in circular connector 111 and lockingly engages shoulder 117 to lock the transceiver subassembly 103 to the device subassembly 102. The cover 168 may be mounted on the transceiver subassembly 103. The connector assembly 155 is aligned with the power terminals 131 together with the TOSA 135 and the ROSA 136 and the connector assembly 155 moved towards the transceiver subassembly 103 so that the latch 165 slides over the cover 168 and engages the ledge 167 of cover to lock the cable assembly 104 to the transceiver subassembly 103.

With such a configuration, the transceiver subassembly 103 may freely rotate through 360 degrees of rotation about an axis 149 through circular connector 111 and cylindrical projection 124. Since the conversion from electrical signals to optical signals occurs outside of the device subassembly 102 and after the interface between the device subassembly 102 and the transceiver subassembly 103, the rotation of the cable assembly 104 relative to the device subassembly 102 is substantially simplified.

Figure 22:
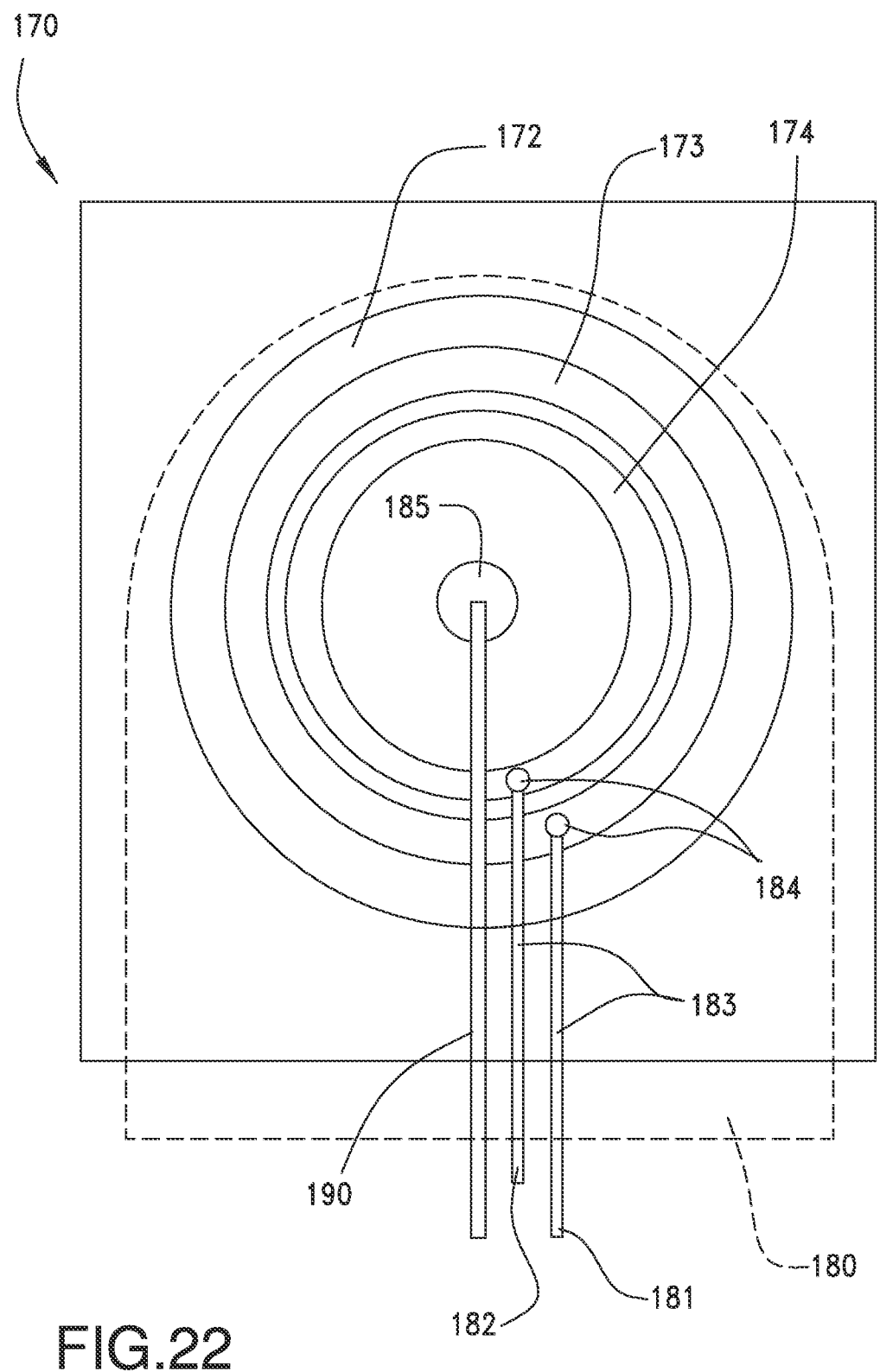
FIGS. 22 and 23 illustrate a second embodiment of a system for high bandwidth signal transmission.
Figure 23:
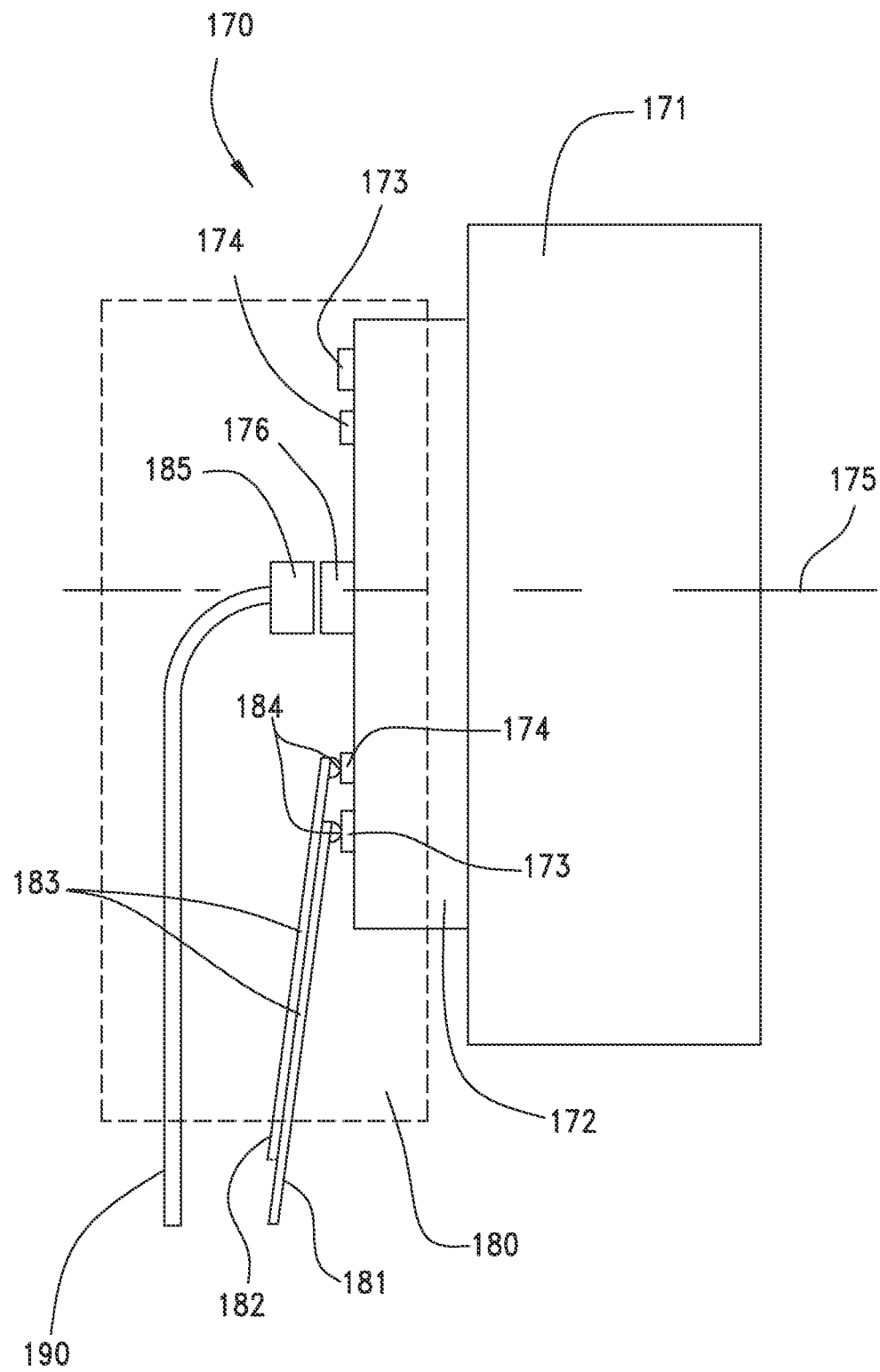

Referring to FIGS. 22-3, an alternate embodiment of a connection system 170 for signal transmission to and from an electronic device (not shown) is depicted. Rather than having a pair of optical fibers, connection system 170 has a single optical fiber 190 that is utilized as a bidirectional signal transmission medium. The electronic device is mounted within housing 171 and connected to a transceiver (not shown) or a TOSA/ROSA (not shown) to convert electrical signals from the electronic device to optical signals while still within the housing 171. As used herein, transceiver assembly means an optical component capable of transmitting and receiving optical signals over a single optical fiber, whether it is a single assembly or two separate assemblies such as a TOSA and a ROSA. A hybrid connector 172 extends from an outer surface of the housing 171 and is electrically and optically connected to the electronic device by a circuit board (not shown) or other components within the housing. Hybrid connector 172 includes both electrical and optical connections. More specifically, a pair of spaced apart concentric electrically conductive contacts 173, 174 extend about a mating axis 175. An expanded beam optical connector component 176 may be positioned along the mating axis 175.

A mating hybrid connector 180 (shown in phantom) is provided that also includes electrical and optical connections. The mating hybrid connector 180 has a pair of electrically conductive terminals 181, 182 mounted therein. Each electrically conductive contact 181, 182 has a deflectable beam 183 and a projection or dimple 184 so as to contact only the desired concentric contact 173, 174. An expanded beam optical connector component 185 may be positioned along the axis 175 to transmit bidirectional optic signals via optical fiber 190 to and from optical connector component 176 of the hybrid connector 172. Appropriate elements may be provided on the housings of the hybrid connectors 176, 185 to secure the two connectors together as desired. Mating hybrid connector 180 may be connected to a hybrid cable, separate electrical and optical cables, or another component, as desired.

The electrical connections between the connectors 172, 180 are utilized to provide power as necessary to the electronic device. The optical connection is utilized for high bandwidth signal transmission. With such a configuration, the mating hybrid connector 180 may freely rotate through 360 degrees of rotation about mating axis 175 relative to hybrid connector 172. Conversion of electrical signals to optical signals may occur within the electronic device or other components within or adjacent housing 171. By utilizing an expanded beam optical interface, no contact and thus no wear occurs between the expanded beam optical connector components 176, 185. As a result, the connectors are free to rotate without impacting or degrading the optical signal transmission.

In the alternative, rather than use the expanded beam optical connector component 176, a transceiver assembly (not shown) associated with hybrid connector 172 may be used that operates with the expanded beam optical connector component 185 of mating hybrid connector 180. Still further, the transceiver assembly may be used with a non-expanded beam optical connector component (not shown) of the mating hybrid connector 180. In either case, the system would have an air gap between the optical components of the hybrid connector 172 and the mating hybrid connector 180 so that relative rotation between the connectors may occur without impacting or degrading the optical signal transmission.

Figure 7:
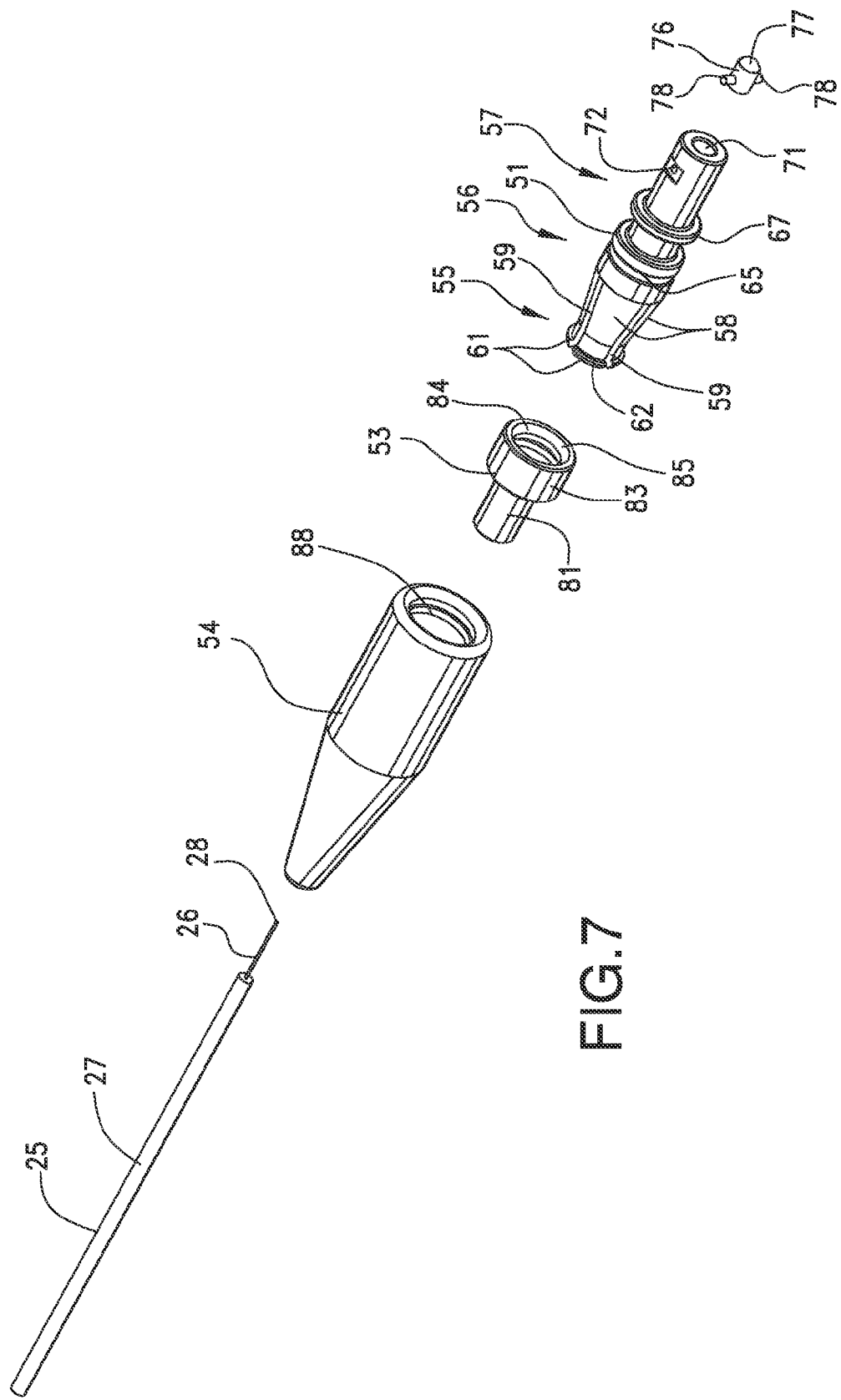
Figure 24:
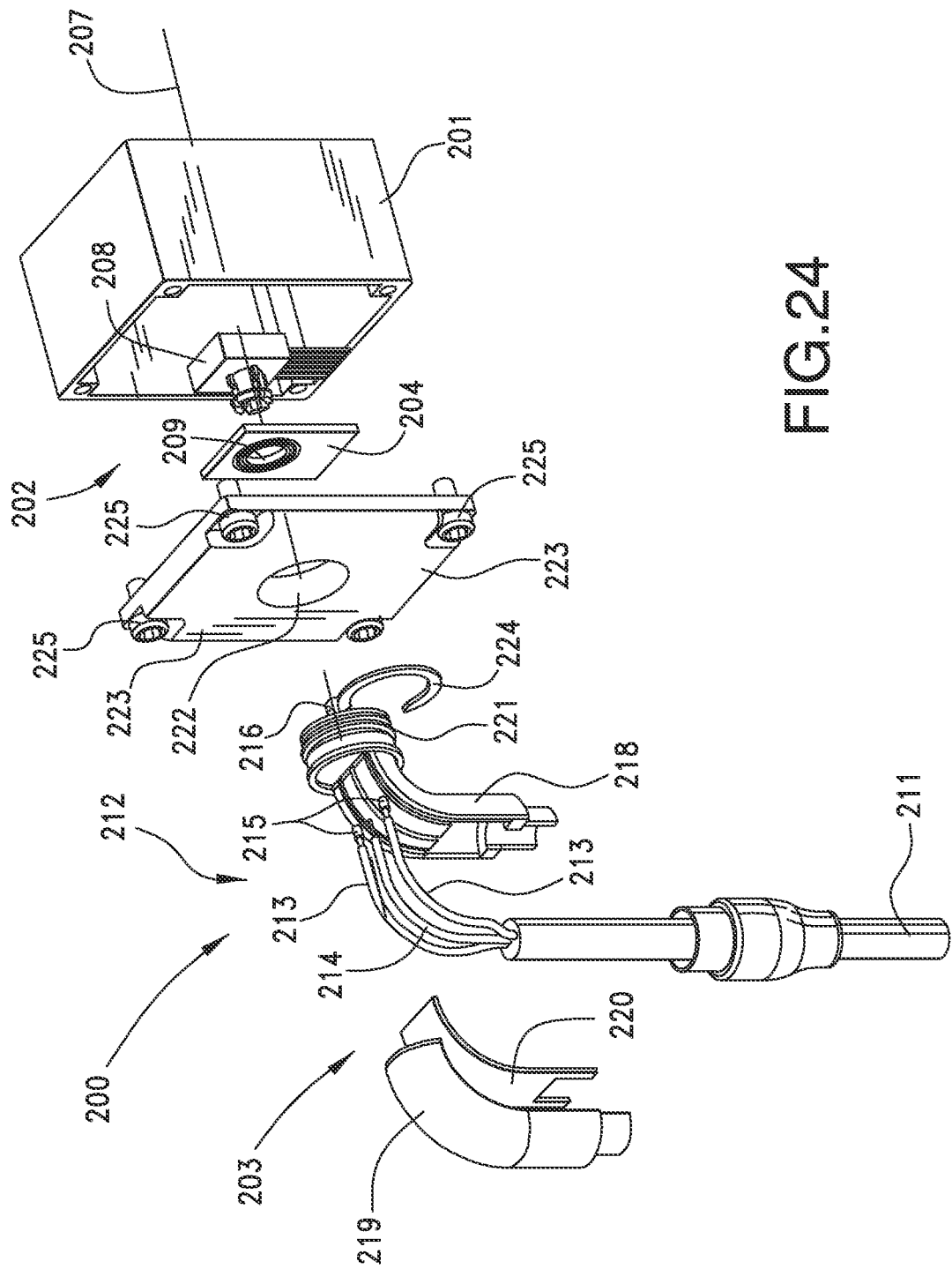
FIGS. 24-27 illustrate a third embodiment of a system for high bandwidth signal transmission.
Figure 25:
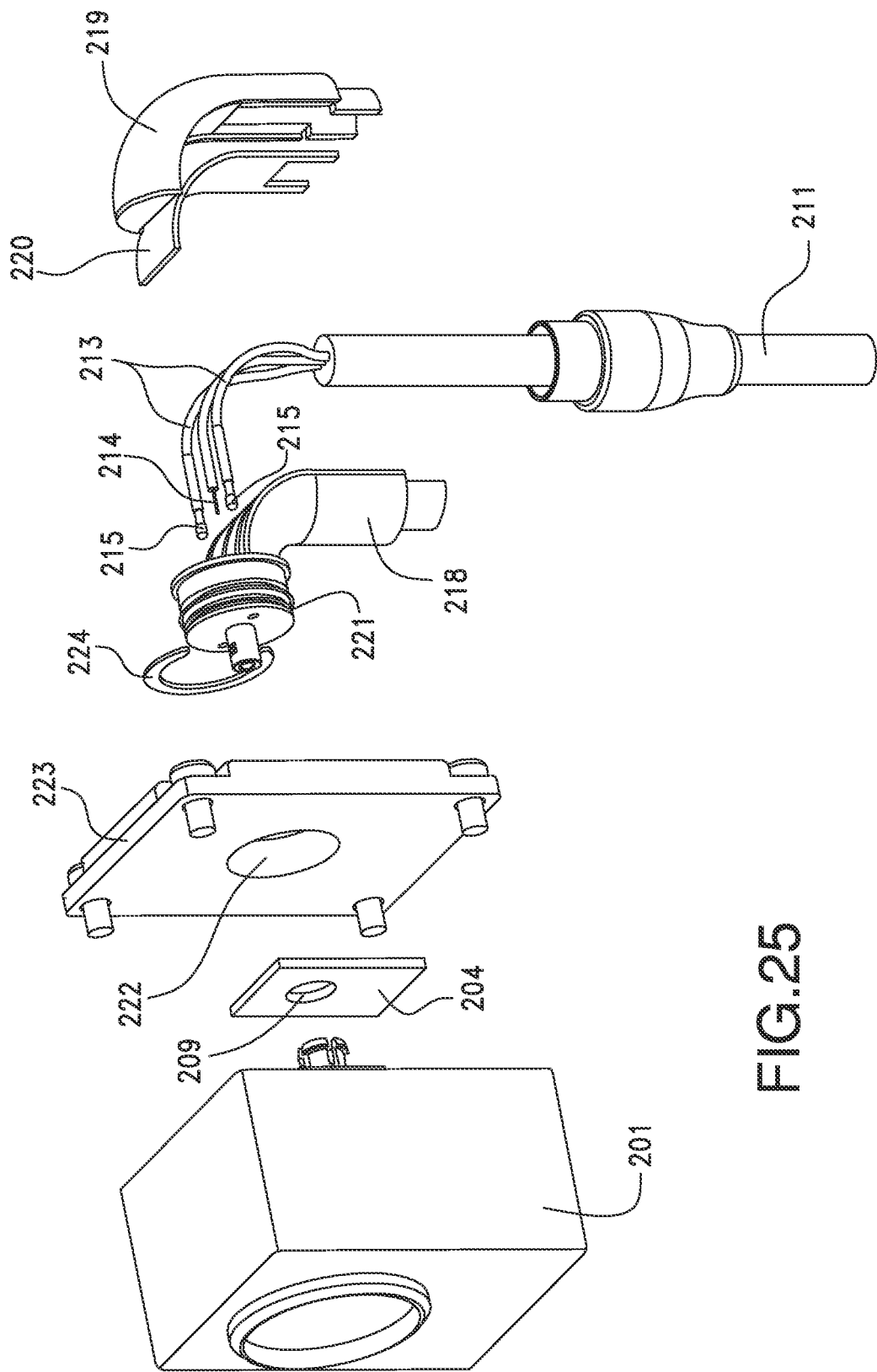
Figure 26:
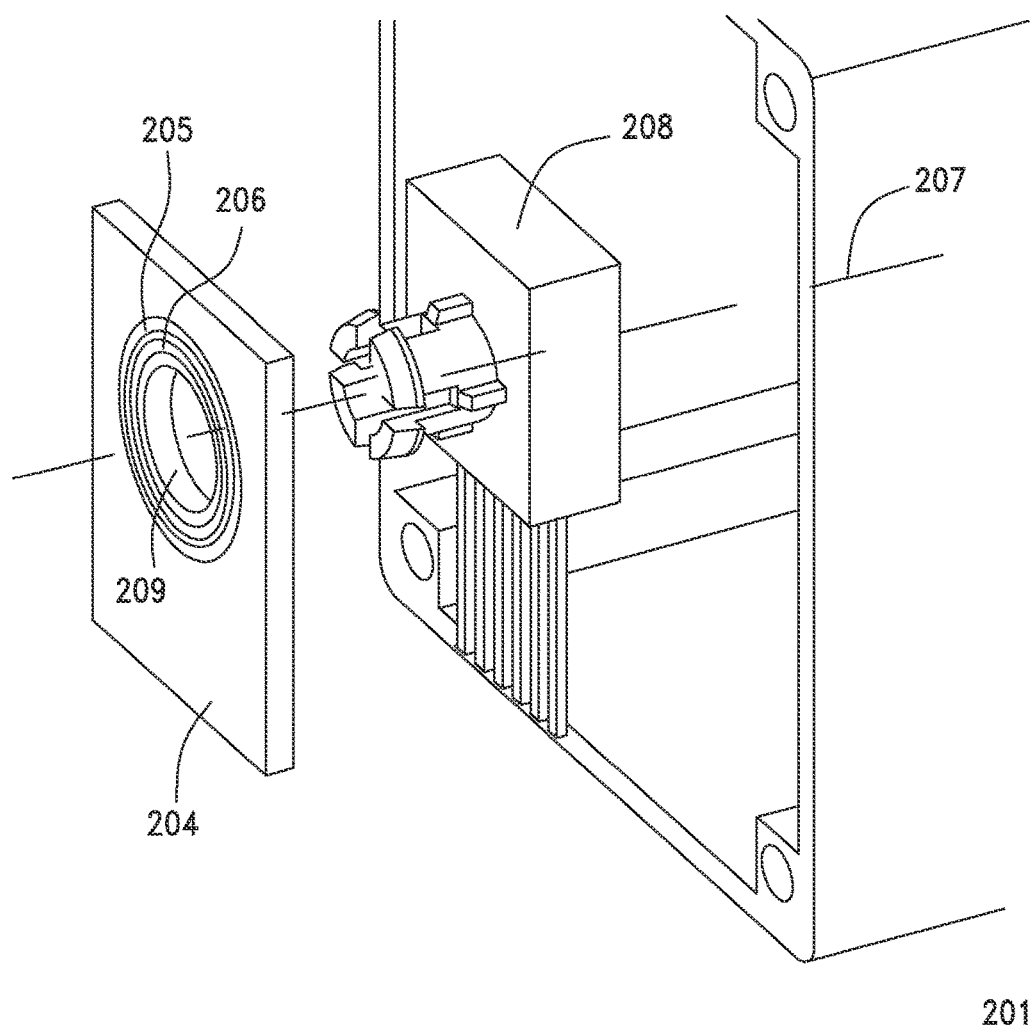
Figure 27:
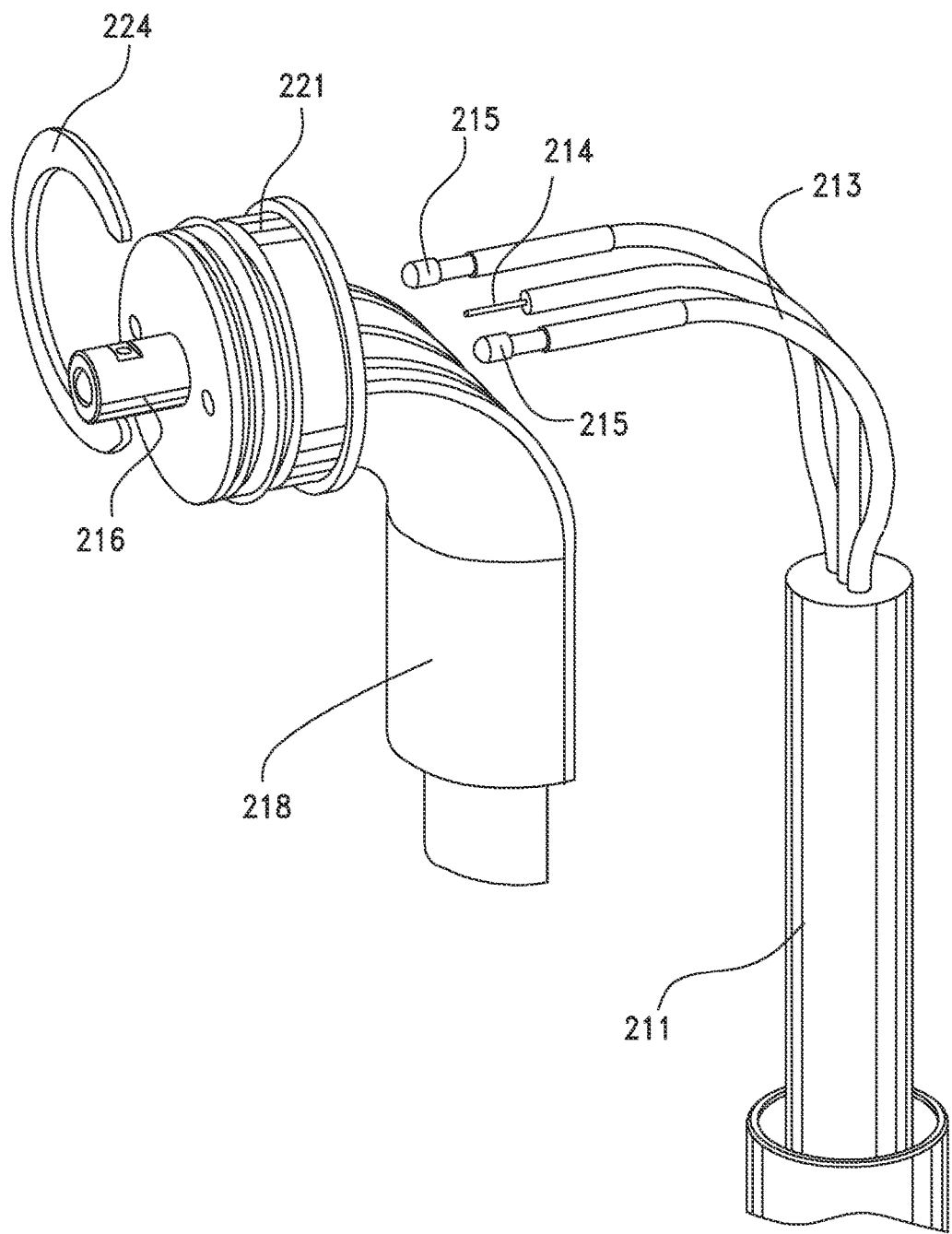

FIGS. 24-7 depict another alternate embodiment of a connection system 200 for signal transmission to and from an electronic device (not shown) having a single optical fiber 200 that is used as a bidirectional signal transmission medium. The electronic device is mounted within housing 201 and is connected to a hybrid connector 202 for optically and electrically connecting the electronic device to a mating hybrid cable assembly 203.

Hybrid connector 202 includes both electrical and optical connections. More specifically, hybrid connector 202 has a contact circuit board 204 with a pair of spaced apart concentric electrically conductive contacts 205, 206 that extend about mating axis 207. Conductive contacts 205, 206 are electrically connected to leads (not shown) within contact circuit board 204. A hole 209 may extend through contact circuit board about mating axis 207. Current may be transmitted through the electrically conductive contacts 205, 206 to power the electronic device and the transceiver assembly 208.

Transceiver assembly 208 is positioned along the mating axis 207 and may extend through hole 209 in contact circuit board 204. A plurality of leads 210 extend from transceiver subassembly 208 for carrying power and various signal functions. Transceiver assembly 208 is configured to convert electrical signals from the electronic device to optical signals so that the signals may be transmitted and received along a single optical axis. Transceiver assembly 208 may be a single assembly such as a transceiver or two separate assemblies such as a TOSA and a ROSA. Signals to be transmitted and received by the transceiver assembly 208 may be sent along the optical path in various manners. In one embodiment, the signals may be sent sequentially along the axis 207. In another embodiment, the signals may be sent simultaneously at different frequencies.

Contact circuit board 204 and transceiver assembly 208 are electrically connected to the electronic device. Such connection may be made by connecting the leads (not shown) of contact circuit board 204 and the leads 209 of transceiver assembly 208 to a circuit board (not shown) or other electrical components.

Mating hybrid cable assembly 203 includes both electrical and optical connections. Mating hybrid cable assembly 203 has a hybrid cable 211 and a mating hybrid connector 212. Hybrid cable 211 has a pair of electrical conductors or wires 213 and a single optical fiber 214. The optical fiber 214 may be made of glass. Each of the electrical conductors 213 has an electrical terminal 215 terminated to the end thereof. The electrical terminals 215 may take various forms including a spring-loaded pin for making a butt contact with the concentric electrically conductive contacts 205, 206 of hybrid connector 202. The optical fiber 214 is terminated to an optical fiber connector 216. As depicted herein the optical fiber connector 216 may be the thermal expansion compensation connectors terminated to the optical fiber cable assemblies 20, 50 depicted in FIGS. 1-9 above. In the alternative, the optical fiber connectors may be other types of connectors, whether expanded beam or otherwise. In some circumstances, it may be desirable to utilize plastic optical fiber instead of glass optical fiber.

Mating hybrid connector 212 has a two-piece generally arcuate housing. The housing has an inner component 218 and an outer component 219. The inner component 218 and the outer component 219 are secured together with the electrically conductive wires 213 and the optical fiber 214 positioned therebetween. A seal 220 may be provided between the inner component 218 and the outer component 219, if desired. The inner component 218 has a forward portion 221 from which the electrical terminals 215 and the optical fiber connector 216 extend for mating with the hybrid connector 202.

Mating hybrid cable assembly 203 may be secured to the housing 201 by passing the forward portion 221 of the inner housing component 218 through a circular opening 222 in cover 223 and attaching clip 224 to the forward portion 221 of the inner housing component. By mounting the assembly of the mating hybrid cable assembly 203 and the cover 223 to the housing 201 such as by screws 225, the mating hybrid cable assembly 203 may be mated to the hybrid connector 202.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. Finally, while a preferred embodiment of the Present Disclosure is shown and described, it is envisioned that those skilled in the art may devise various modifications without departing from the spirit and scope of the foregoing Description and the appended Claims.

What is claimed is:

1. An optical fiber assembly comprising:
  an optical fiber having a forward end;
  a ferrule supporting the optical fiber;
  a beam expanding element aligned with the forward end of the optical fiber; and
  a thermal expansion compensation element adjacent the optical fiber to compensate for thermal expansion differences between the optical fiber and the ferrule, wherein the beam expanding element is a resilient lens within a forward passage of the ferrule and the forward end of the optical fiber engages the resilient lens, wherein the ferrule includes a central bore to receive the optical fiber which is secured to a rear section of the ferrule, and wherein the ferrule is configured to permit, when contracting, the forward passage to move rearwardly towards the rear section, shortening the distance between the rear section and the rear surface of the resilient lens and causing the forward end of the optical fiber to press further into and further deform the rear surface of the resilient lens.

2. The optical fiber assembly of claim 1, wherein the ferrule includes a central bore with a central axis, the central bore being dimensioned to permit a portion of the optical fiber spaced from the forward end to move laterally along the central axis while the forward end remains aligned with the beam expanding element.

3. The optical fiber assembly of claim 2, wherein the resilient lens is insert molded within the ferrule.

* * * * *